United States Patent
Kamada et al.

(10) Patent No.: US 9,366,339 B2
(45) Date of Patent: Jun. 14, 2016

(54) VEHICLE SHIFT CONTROL DEVICE

(75) Inventors: Atsushi Kamada, Toyota (JP); Yoshinobu Nozaki, Anjo (JP); Naoki Itazu, Nagoya (JP); Yusuke Nakade, Toyota (JP); Kazumi Endo, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 636 days.

(21) Appl. No.: 13/810,084

(22) PCT Filed: Jul. 14, 2010

(86) PCT No.: PCT/JP2010/061927
§ 371 (c)(1),
(2), (4) Date: Mar. 8, 2013

(87) PCT Pub. No.: WO2012/008029
PCT Pub. Date: Jan. 19, 2012

(65) Prior Publication Data
US 2014/0318294 A1  Oct. 30, 2014

(51) Int. Cl.
| | |
|---|---|
| *F16H 63/34* | (2006.01) |
| *F16H 61/02* | (2006.01) |
| *F16H 61/32* | (2006.01) |
| *H02P 29/00* | (2016.01) |
| *H02K 15/12* | (2006.01) |

(52) U.S. Cl.
CPC ............ *F16H 61/0213* (2013.01); *F16H 61/32* (2013.01); *F16H 63/3466* (2013.01); *H02P 29/005* (2013.01); *H02K 15/125* (2013.01); *Y10T 74/2003* (2015.01)

(58) Field of Classification Search
None
See application file for complete search history.

(56) References Cited

U.S. PATENT DOCUMENTS

| | | | |
|---|---|---|---|
| 2004/0033284 A1* | 2/2004 | Adachi | H02K 7/14 425/135 |
| 2007/0144287 A1* | 6/2007 | Kimura | F16H 61/32 74/335 |

(Continued)

FOREIGN PATENT DOCUMENTS

| | | |
|---|---|---|
| JP | 2003-130217 A | 5/2003 |
| JP | 2004-166332 A | 6/2004 |

(Continued)

*Primary Examiner* — Justin Holmes
(74) *Attorney, Agent, or Firm* — Kenyon & Kenyon LLP

(57) ABSTRACT

A vehicle shift control device includes: a parking lock device selectively switched by driving of an electric motor between a lock position restraining rotation of wheels and a non-lock position not restraining the rotation of the wheels; and an electronic control device controlling the electric motor, the vehicle shift control device providing a parking lock switching control of selectively switching the parking lock device between the lock position and the non-locking position in an activated state of the electronic control device, wherein if the electronic control device is switched from the deactivated state to the activated state, the vehicle shift control device provides a wall abutment control of driving the parking lock device with the electric motor to a mechanical displacement end before starting the provision of the parking lock switching control, and if a temperature of the electric motor is lower than a predefined low-temperature determination value, the vehicle shift control device provides an electric motor heat generation control of energizing the electric motor without rotating the electric motor after the electronic control device is switched from a deactivated state to an activated state and before starting the provision of the wall abutment control.

20 Claims, 10 Drawing Sheets

(56) References Cited

U.S. PATENT DOCUMENTS

| | | | |
|---|---|---|---|
| 2007/0200523 A1* | 8/2007 | Sasaki | B60L 7/00 318/434 |
| 2009/0091284 A1 | 4/2009 | Isobe et al. | |
| 2009/0282943 A1 | 11/2009 | Mueller | |
| 2010/0256880 A1* | 10/2010 | Sato | F16H 59/105 701/55 |
| 2010/0286883 A1* | 11/2010 | Kato | B60K 6/445 701/70 |
| 2013/0110365 A1* | 5/2013 | Kimura | F16H 61/12 701/65 |

FOREIGN PATENT DOCUMENTS

| | | |
|---|---|---|
| JP | 2004-278752 A | 10/2004 |
| JP | 2006-200603 A | 8/2006 |
| JP | 2007-330674 A | 12/2007 |
| JP | 2009-095101 A | 4/2009 |
| JP | 2009-528488 A | 8/2009 |

\* cited by examiner

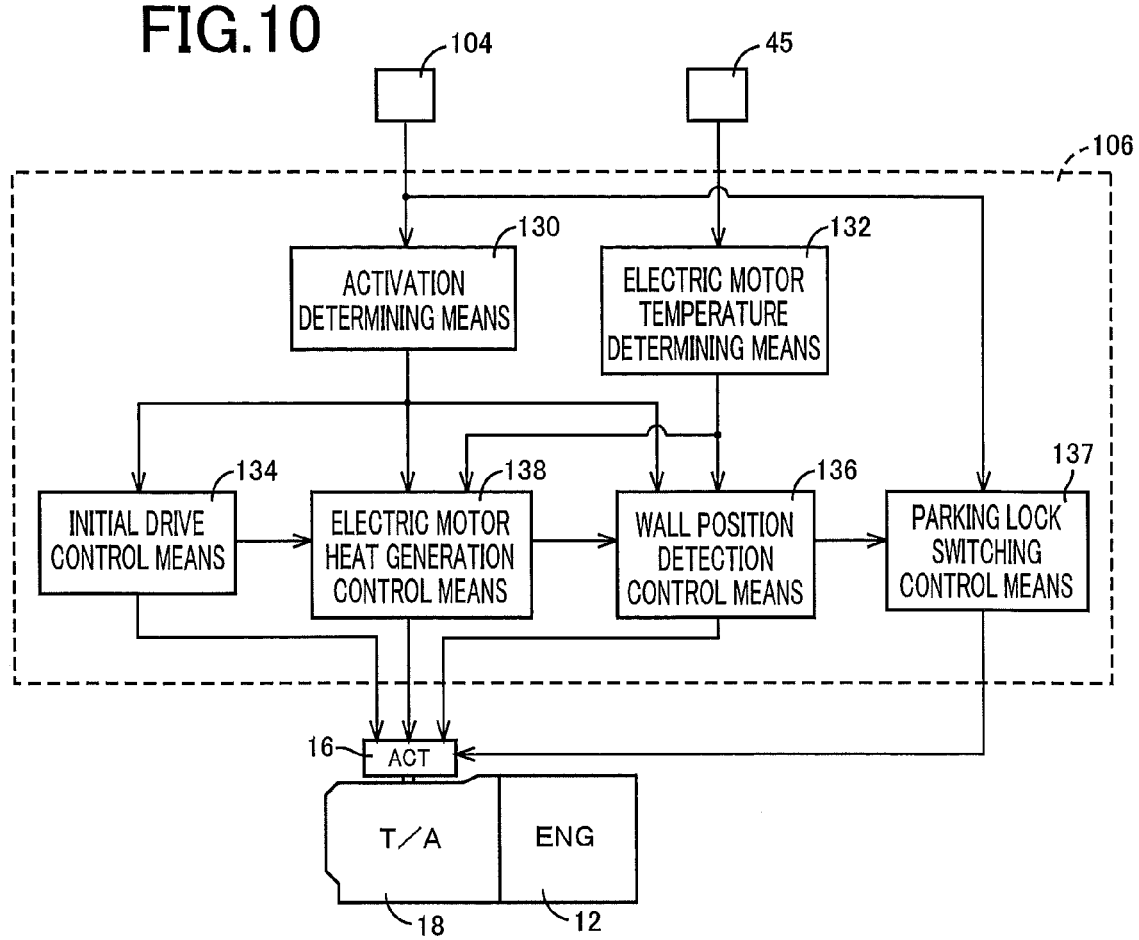

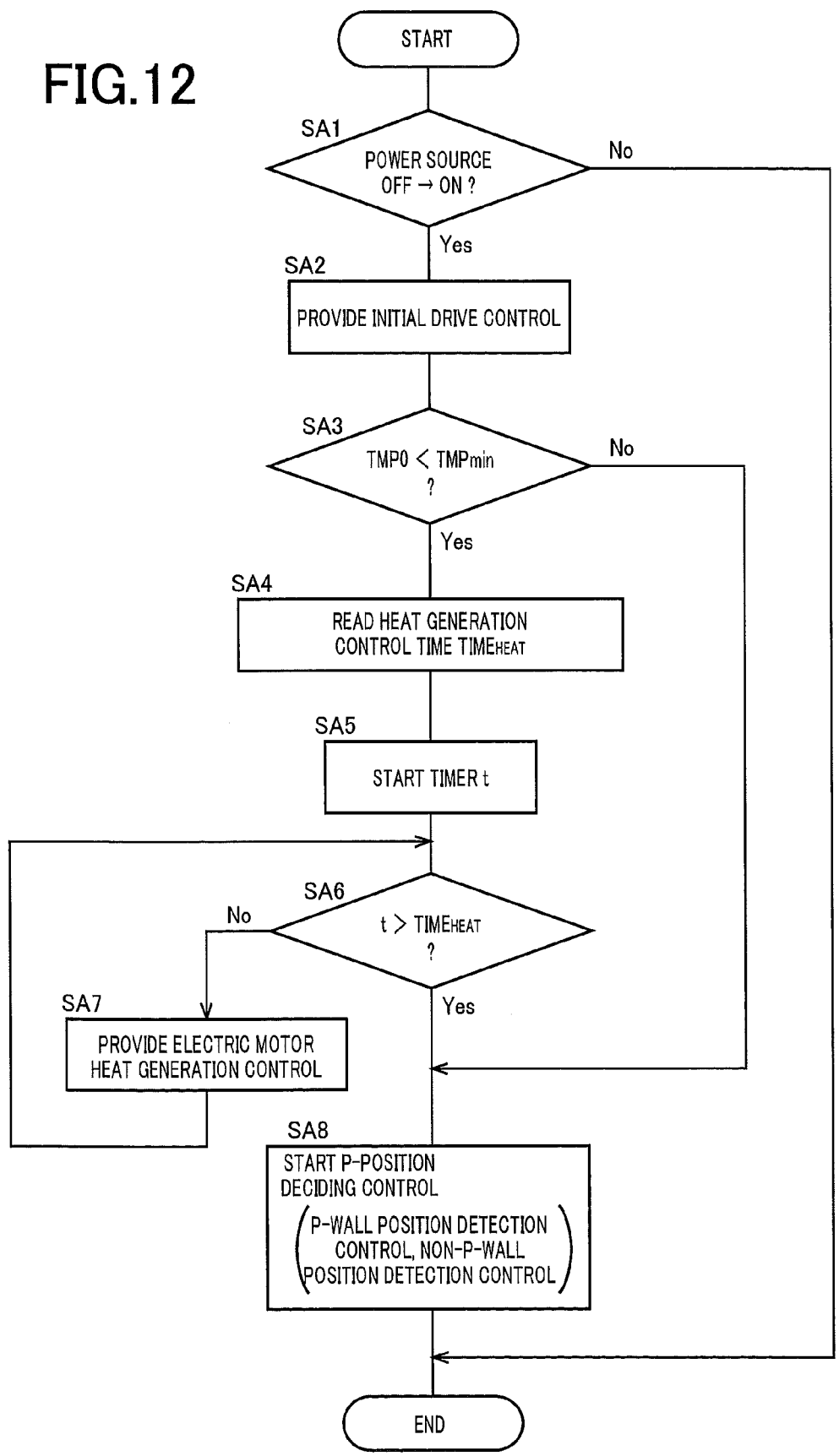

VEHICLE SHIFT CONTROL DEVICE

This is a 371 national phase application of PCT/JP2010/061927 filed 14 Jul. 2010, the contents of which are incorporated herein by reference.

TECHNICAL FIELD

The present invention relates to a control technique of an electric motor making up a shift-by-wire system.

BACKGROUND ART

A vehicle shift control device is well known that employs a so-called shift-by-wire (SBW) system activating an electric motor based on a control signal to electrically switch shift positions related to running of a vehicle. For example, this corresponds to a motorcycle transmission control device disclosed in Patent Document 1. Specifically, the motorcycle transmission control device performs clutch operation and shifting operation by using power of an electric motor based on a shift command of a driver. If a driver frequently generates an unnecessary shift command by operation of a handy switch, the motorcycle transmission control device determines that the shift command is abnormal and cancels the shift command. This enables prevention of a temperature increase in an electric motor and over discharge of a battery due to the high-frequency energization of the electric motor.

PRIOR ART DOCUMENTS

Patent Documents

Patent Document 1: Japanese Laid-Open Patent Publication No. 2006-200603
Patent Document 2: Japanese Laid-Open Patent Publication No. 2009-528488
Patent Document 3: Japanese Laid-Open Patent Publication No. 2004-166332
Patent Document 4: Japanese Laid-Open Patent Publication No. 2003-130217

SUMMARY OF THE INVENTION

Problem to Be Solved by the Invention

The electric motor making up the SBW system includes a coil for generating a rotation force (torque) and the internal resistance of the coil becomes lower when the temperature of the electric motor is lower. If a voltage applied to the coil is not changed, a current applied to the coil becomes larger when the internal resistance of the coil is lower and, therefore, a magnetic force generated by the coil becomes stronger and the output torque of the electric motor (electric motor torque) becomes larger. Therefore, if the electric motor is driven at very low temperature under the same voltage control as that at the time of normal temperature, the durability may be deteriorated in mechanical members transmitting the electric motor torque. For example, since no countermeasure against very low temperature is described in Patent Document 1, it is believed that the durability of the mechanical members transmitting the electric motor torque may be deteriorated at very low temperature as described above in the motorcycle transmission control device. In this regard, although countermeasures are conceivable such as increasing the strength of the mechanical members transmitting the electric motor torque in accordance with electric motor torque at very low temperature and providing a current limit circuit limiting the current supplied to the electric motor to a predetermined limit value or less, cost is increased in any case. Such a problem is not known.

The present invention was conceived in view of the situations and it is therefore an object of the present invention to provide a vehicle shift control device having a shift-by-wire system capable of suppressing deterioration in durability of mechanical members transmitting an output torque of an electric motor making up a shift-by-wire system.

Means for Solving the Problems

To achieve the object, the present invention provides (a) a vehicle shift control device comprising: a parking lock device selectively switched by driving of an electric motor between a lock position restraining rotation of wheels and a non-lock position not restraining the rotation of the wheels; and an electronic control device controlling the electric motor, the vehicle shift control device providing a parking lock switching control of selectively switching the parking lock device between the lock position and the non-lock position in an activated state of the electronic control device, wherein (b) if a temperature of the electric motor is lower than a predefined low-temperature determination value, the vehicle shift control device provides an electric motor heat generation control of energizing the electric motor without rotating the electric motor after the electronic control device is switched from a deactivated state to an activated state and before starting the provision of the parking lock switching control.

The Effects of the Invention

Consequently, if the temperature of the electric motor is lower than the low-temperature determination value, since the electric motor is energized to generate heat by the provision of the electric motor heat generation control, the internal resistance of the electric motor is increased to some extent before starting the provision of the parking lock switching control and the electric motor torque based on the supply current to the electric motor is suppressed in accordance with the internal resistance. Therefore, the electric motor torque during the provision of the parking lock switching control can be suppressed to an allowable level, thereby suppressing the deterioration in durability of a mechanical member transmitting the electric motor torque. Since it is not necessary to dispose a current limit circuit limiting the current supplied to the electric motor to a predetermined limit value or less and it is not necessary to enhance the strength of the mechanical member in accordance with the electric motor torque in the case of the temperature of the electric motor lower than the low-temperature determination value, cost increase can be suppressed in the vehicle shift control device. In the electric motor heat generation control, "without rotating the electric motor" is not limited to completely preventing the rotation of the electric motor and, even when the electric motor is somewhat rotated at the start of energization of the electric motor, if the rotation is not continued during the provision of the electric motor heat generation control, this corresponds to energizing the electric motor without rotating the electric motor.

Preferably, (a) if the electronic control device is switched from the deactivated state to the activated state, the vehicle shift control device provides a wall abutment control of driving the parking lock device with the electric motor to a mechanical displacement end before starting the provision of the parking lock switching control, and wherein (b) the vehicle shift control device provides the electric motor heat generation control before starting the provision of the wall abutment control. Consequently, although in the wall abutment control, the electric motor torque must be received at the mechanical displacement end by the constituent members of the parking lock device, since it is not necessary to enhance the strength of the constituent members related to the wall abutment control in accordance with the electric motor torque in the case of the temperature of the electric motor lower than the low-temperature determination value, the cost of the parking lock device can be suppressed.

Preferably, the electric motor is a motor that includes a stator having a plurality of salient poles with windings wound therearound and a rotor disposed rotatably relative to the stator and having a plurality of salient poles and that rotates the rotor by sequentially supplying a current to the windings based on rotation position information of the rotor. Consequently, since the electric motor can be made of a simple structure, the vehicle shift control device with inexpensive and mechanically reliable can be provided. The electric motor is a switched reluctance motor (SR motor) or a stepping motor, for example.

Preferably, if the electronic control device is switched from the deactivated state to the activated state, the vehicle shift control device provides initial drive control of energizing the electric motor for recognizing a relative positional relationship between the rotor and the stator of the electric motor and provides the electric motor heat generation control after the provision of the initial drive control. Consequently, since the provision of the initial drive control reveals which of the coils disposed on the stator of the electric motor is energized without rotating the electric motor, the energization pattern to the electric motor in the electric motor heat generation control can easily be determined.

Preferably, in the electric motor heat generation control, energizing the electric motor without rotating the electric motor means that the electric motor is energized in an energization pattern locking the rotor of the electric motor. Consequently, since the rotor of the electric motor is actively prevented from rotating, this can reduce the possibility that the electric motor accidentally rotates during the provision of the electric motor heat generation control. For example, when the temperature of the electric motor is not risen enough by the energization, the possibility that the electric motor rotates in association with large electric motor torque can be reduced.

Preferably, (a) in the electric motor heat generation control, the electric motor is energized for a predefined heat generation control time, and wherein (b) when a temperature of the electric motor before starting the provision of the electric motor heat generation control is lower, the heat generation control time is made longer. Consequently, the internal resistance of the electric motor can be made less variable after the provision of the electric motor heat generation control if the temperature of the electric motor is different. For example, if the electric motor is at very low temperature, sufficient heat generation is achieved, while if the temperature of the electric motor is closer to the low-temperature determination value, the electric motor heat generation control can be completed earlier.

Preferably, if the temperature of the electric motor is equal to or higher than the low-temperature determination value, the electric motor heat generation control is not provided. Consequently, if the provision of the electric motor heat generation control is not necessary, the provision of the parking lock switching control can be started early after the electronic control device is switched from the deactivated state to the activated state and wasteful power consumption can be avoided.

Preferably, a temperature detected in a drive device driving the wheels is considered as the temperature of the electric motor. Consequently, since the vehicle shift control device can determine whether the electric motor heat generation control is provided without providing devices such as a temperature sensor to detect the temperature of the electric motor, the cost can be suppressed.

Preferably, the electric motor is disposed with an electric motor temperature sensor, and wherein the temperature of the electric motor is detected by the electric motor temperature sensor. Consequently, the temperature of the electric motor can be accurately detected and, therefore, the necessity of the electric motor heat generation control can accurately be determined.

Preferably, a vehicle having the vehicle shift control device includes a vehicle power transmission device on a power transmission path from a power source to drive wheels, for example. Although, for example, an internal-combustion engine generating power through combustion of fuel such as a gasoline engine and a diesel engine is preferably used for the power source, other prime movers such as an electric motor can be employed solely or in combination with the engine. Therefore, the vehicle is made up of, for example, an engine drive vehicle using only an engine as the power source, an electric vehicle using only an electric motor as the power source, a hybrid vehicle using both an engine and an electric motor as the power sources, a vehicle including a prime mover other than an engine and an electric motor as a prime mover, or a vehicle including three or more prime movers.

Preferably, the vehicle power transmission device is made up of a single transmission, a transmission having a torque converter and a plurality of gear ratios, or a decelerating mechanism portion and a differential mechanism portion in addition to the transmission etc. This transmission is made up of, for example, reduction gears such as a planetary gear device coupled to the electric motor in the electric vehicle; various planetary gear automatic transmissions having, for example, four forward speeds, five forward speeds, six forward speeds, or more gear stages with a plurality of sets of rotating elements of a planetary gear device selectively coupled by an engagement device to achieve a plurality of gear stages (shift stages) in an alternative manner; a synchronous meshing type parallel two-shaft transmission including pairs of always engaging change gears between two shafts to put any one of the pairs of the change gears into a power transmission state by a synchronizing device in an alternative manner, the synchronous meshing type parallel two-shaft automatic transmission having shift stages automatically switched by a synchronizing device driven by a hydraulic actuator; a so-called belt type continuously variable transmission having a transmission belt acting as a power transmission member wrapped around a pair of variable pulleys having a variable effective diameter so as to continuously vary a gear ratio in a stepless manner; a so-called traction type continuously variable transmission having a pair of cones rotated around a common shaft center and a plurality of rollers capable of rotating around a rotation center intersecting with the shaft center such that the rollers are interposed and pressed between the pair of the cones to change an intersection angle between the rotation center of the rollers and the shaft center so as to vary a gear ratio; an automatic transmission including a differential mechanism made up of for example, a planetary gear device distributing the power from the engine to a first electric motor and an output shaft, and a second electric motor disposed on the output shaft of the differential mechanism, the automatic transmission acting as an electric continuously variable transmission with a gear ratio electrically changed by mechanically transmitting a main portion of the power from the engine toward drive wheels with the differential action of the differential mechanism and electrically transmitting the remaining portion of the power from the engine by using an electric path from the first electric motor to the second electric motor to electrically change a gear ratio; or an automatic transmission mounted on a so-called parallel hybrid vehicle including an electric motor on an engine shaft, an output shaft, etc., in a power transmittable manner.

Preferably, the parking lock device turns to the locked state at the locked position by engaging a locking tooth with rotating teeth rotating together with the wheels and turns to unlocked state achieved by releasing the locked state at the unlocked position. Although the rotating teeth are fixed to, for example, the output rotating member of the transmission coupled to the wheels, the rotating teeth can be fixed to another rotating member within a directly coupled range of the wheels.

BRIEF DESCRIPTION OF THE DRAWINGS

FIG. 10 is a functional block diagram for explaining a main portion of the control function included in the P-ECU of FIG. 1.

FIG. 12 is a flowchart for explaining a first main portion of control actuation of the P-ECU of FIG. 1, i.e., control actuation of providing the electric motor heat generation control after the activation of the P-ECU.

MODE FOR CARRYING OUT THE INVENTION

An embodiment of the present invention will now be described in detail with reference to the drawings.

Embodiment

Figure 1:
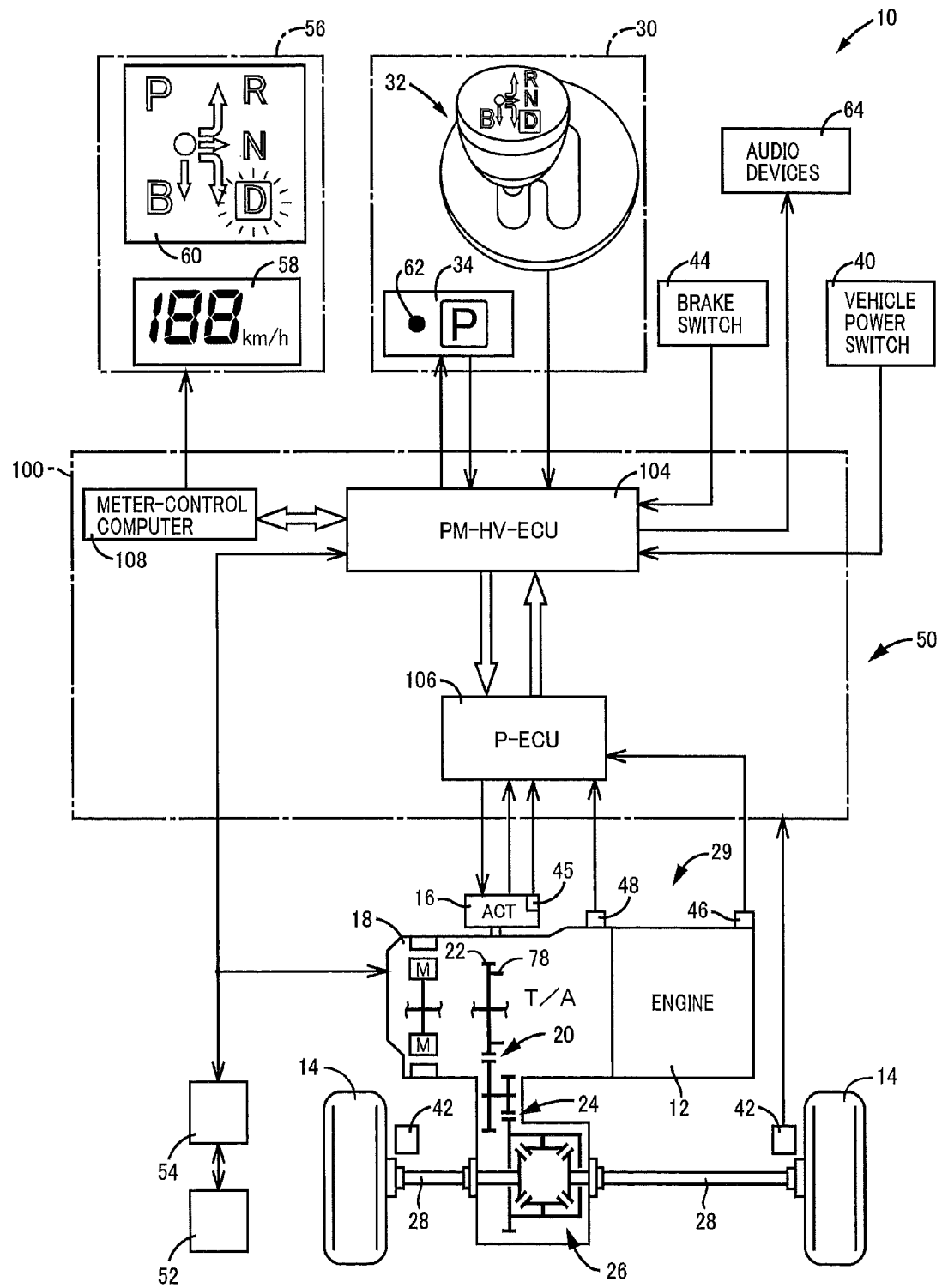
FIG. 1 is a diagram for explaining a general configuration of a power transmission path from an engine to drive wheels making up a vehicle to which the present invention is applied and is a block diagram for explaining a main portion of a control system disposed on the vehicle for controlling a parking lock device.

FIG. 1 is a diagram for explaining a general configuration of a power transmission path from an engine 12 to drive wheels 14 making up a vehicle 10 to which the present invention is applied and is a block diagram for explaining a main portion of a control system disposed on the vehicle 10 for controlling a parking lock device 16. In FIG. 1, the vehicle 10 includes the parking lock device 16, a transmission 18, a shift operating device 30, etc., and employs a shift-by-wire (SBW) mode in which a shift position $P_{SH}$ related to the running of the vehicle 10, i.e., the shift position (shift range) $P_{SH}$ of the transmission 18, is electrically switched. The parking lock device 16, the shift operating device 30, and a vehicle control device 100 make up a vehicle shift control device 50 providing shift control of the transmission 18.

The transmission 18 is preferably used in, for example, an FF (front-engine front-drive) vehicle having the transmission mounted transversely on the vehicle 10 and transmits the power of the engine 12, which is an internal-combustion engine acting as a drive force source for running, from an output gear 22 acting as an output rotating member of the transmission 18 making up one gear of a counter gear pair 20 sequentially through the counter gear pair 20 acting as a power transmission device, a final gear pair 24, a differential gear device (differential gear) 26, and a pair of axles (drive shafts (D/S)) 28 to a pair of the drive wheels 14. A transaxle (T/A) is made up of the transmission 18, the counter gear pair 20, the final gear pair 24, the differential gear device (differential gear) 26, etc. The engine 12, an electric motor M for running, the transmission 18, the counter gear pair 20, the final gear pair 24, and the differential gear device 26 make up a vehicle drive device 29 driving the drive wheels (wheels) 14. Although the following description will be made of an example in the case that the present invention is applied to a hybrid vehicle including the engine 12 and the electric motor M for running as drive force sources, the present invention may be applied to vehicles in any forms such as a normal engine vehicle, a hybrid vehicle, an electric-powered vehicle, and a fuel-cell vehicle as long as the shift-by-wire mode is employed.

The vehicle control device 100 disposed in the vehicle 10 includes a so-called microcomputer having a CPU, a RAM, a ROM, and an I/O interface, for example, and the CPU executes signal processes in accordance with programs stored in advance in the ROM, while utilizing a temporary storage function of the RAM, to provide the hybrid drive control such as the output control of the engine 12 and the drive control of the electric motor M for running, the shift control of the transmission 18, the switching control of the shift position $P_{SH}$ of the transmission 18 using the shift-by-wire mode, and the switching control of the actuation state of the parking lock device 16.

The vehicle control device 100 is supplied with, for example, a shift lever position signal corresponding to an operation position $P_{OPE}$ from a shift sensor 36 and a select sensor 38 (see FIG. 2) acting as position sensors for detecting the operation position (operation position) $P_{OPE}$ of a shift lever 32; a P-switch signal indicative of a switch operation in a P-switch 34 operated by a user for switching the shift position $P_{SH}$ of the transmission 18 from a non-P-position other than a parking position (P-position) to the P-position; a P-position signal indicative of an actuation state of a P-lock in the parking lock device 16 for actuating or releasing the parking lock (P-lock) to switch the shift position $P_{SH}$ of the transmission 18 between the P-position and a non-P-position; a power switch signal indicative of a switch operation in a vehicle power switch 40 operated by a user for switching a power-supply switching state of the vehicle 10; a wheel speed pulse signal corresponding to a vehicle speed V indicative of a rotation speed $N_W$ of wheels (the drive wheels 14 and driven wheels) from a wheel speed sensor 42 acting as a rotation speed sensor; a brake operation signal indicative of a brake-on state $B_{ON}$ from a brake switch 44 indicating that a foot brake pedal not depicted is operated for detecting actuation of a regular brake; a signal indicative of an electric motor temperature $TMP_{MR}$ detected by an electric motor temperature sensor 45 disposed on a P-lock drive motor 68 (see FIG. 3); a signal indicative of a cooling water temperature $TMP_W$ of the engine 12 detected by the cooling water temperature sensor 46; a signal indicative of an operating oil temperature $TMP_{AT}$ of a hydraulic circuit of the transmission 18 etc., detected by a transmission oil temperature sensor 48; a signal indicative of a charging current or discharging current $I_{CD}$ of an electric storage device 52; a signal indicative of a voltage $V_{BAT}$ of the electric storage device 52; and a signal indicative of a charging state (state of charge) SOC of the electric storage device 52.

The vehicle control device 100 outputs, for example, hybrid control command signals such as an engine output control command signal for output control of the engine 12, a motor control command signal for drive control of the electric motor M for running in the transmission 18, and a shift control command signal for shift control of the transmission 18; a shift position switching control command signal for switching the shift position $P_{SH}$ of the transmission 18; a vehicle speed display control command signal for displaying the current vehicle speed V by actuating a speed meter 58 disposed in a known combination meter 56 acting as a display device for clearly indicating vehicle information related to vehicle running to a user; a shift position display control command signal for displaying a switching state of the shift position $P_{SH}$ in the transmission 18 by actuating a shift position indicator (shift position display device) 60 disposed in the combination meter 56; a parking lock display control command signal (P-lock display control command signal) for displaying a P-lock state by actuating a P-position indicator lump 62 acting as a lock display lump lighted for clearly indicating that the P-lock is in operation (a parking lock state, a P-lock state), i.e., the shift position $P_{SH}$ is the P-position; and a P-switching control command signal for the switching control of the parking lock device 16. The P-position indicator lump 62 is a display lump actuated not in conjunction with the actuation (turning on/off) of the combination meter 56 and is disposed on the P-switch 34, for example.

Specifically, the vehicle control device 100 includes a power-control and hybrid-control computer (hereinafter referred to as "PM-HV-ECU") 104, a parking-control computer (hereinafter referred to as "P-ECU") 106, a meter-control computer (hereinafter referred to as "meter-ECU") 108, etc. The P-ECU 106 corresponds to an electronic control device of the present invention.

The PM-HV-ECU 104 switches the power-supply switching state of the vehicle 10 based on a power switch signal from the vehicle power switch 40 operated by a user, for example. In this embodiment, the power-supply switching state of the vehicle 10 can be shifted to any one of a power-off state (ALL-OFF state, IG/ACC-OFF state) for disabling the running of the vehicle, a partially-power-on state (ACC-ON state, IG-OFF state) for enabling only a portion of the functions of the vehicle 10 to operate with the combination meter 56 turned off while the running of the vehicle is disabled, a power-on state (IG-ON state) when the power supply related to the running of the vehicle is turned on with the combination meter 56 turned on, and a running-enabled state (READY-ON state), which is a state enabling control of the running of the vehicle through a hybrid control command signal related to the running of the vehicle while the vehicle 10 can start and run if an accelerator is turned on, for example. Enabling only a portion of the functions of the vehicle 10 to operate means the energization for enabling operation of a navigation system and audio devices 64 or the energization of a battery power take-out socket not depicted, for example. The IG-ON state is a power-on state in which the functions other than controlling the running of the vehicle through the hybrid control command signal are controllable (e.g., the switching control of the shift position $P_{SH}$ of the transmission 18 can be provided) and this is a state in which the engine 12 is not activated and the electric motor M for running cannot be driven, i.e., the vehicle 10 cannot start and run even if the accelerator is turned on. The operation of the vehicle power switch 40 can achieve the READY-ON state on the condition that no failure occurs in an initial process (initial process) of the P-ECU 106 itself and initial drive control in the parking lock device 16 executed before switching to the READY-ON state, in addition to the operation of the vehicle power switch 40. In other words, even if the operation of the vehicle power switch 40 for switching to the READY-ON state is performed, the occurrence of such a failure causes switching to another switching state, for example, to the IG-ON state, instead of switching to the READY-ON state.

For example, when an input of the power switch signal is detected in the brake-on state $B_{ON}$ at the P-position, the PM-HV-ECU 104 switches the power-supply switching state of the vehicle 10 to the READY-ON state from any state. When the vehicle speed V is less than a predetermined stop vehicle speed V' and the input of the power switch signal is detected in the IG-ON state or the READY-ON state at the P-position, the PM-HV-ECU 104 switches the power-supply switching state of the vehicle 10 to the ALL-OFF state. When the input of the power switch signal is detected in a state other than the brake-on state $B_{ON}$ at the P-position, the PM-HV-ECU 104 switches the power-supply switching state of the vehicle 10 in the order of the ALL-OFF state→the ACC-ON state→the IG-ON state the ALL-OFF state→ . . . each time the power switch signal is input. When the vehicle speed V is less than the predetermined stop vehicle speed V' and the input of the power switch signal is detected in the IG-ON state at a non-P-position, the PM-HV-ECU 104 outputs to the P-ECU 106 an automatic P-lock switching request signal for actuating the parking lock device 16 to automatically turn the shift position $P_{SH}$ to the P-position and switches the power-supply switching state of the vehicle 10 to the ALL-OFF state after the P-position is ensured (this series of actuations is called "automatic P-actuation"). The predetermined stop vehicle speed V' is a vehicle stop determination speed empirically obtained and stored in advance for determining a vehicle stop state, for example.

The PM-HV-ECU 104 generally controls, for example, the actuation of the transmission 18. For example, when switching the power-supply switching state of the vehicle 10 to the READY-ON state, the PM-HV-ECU 104 activates a hybrid system for enabling the running of the vehicle and outputs the hybrid control command related to the running of the vehicle to the engine 12, the electric motor M for running, and the transmission 18 to control the running of the vehicle. The PM-HV-ECU 104 outputs to the transmission 18 the shift position switching control command based on the shift lever position signal corresponding to the operation position $P_{OPE}$ from the shift sensor 36 and the select sensor 38, switching the shift position $P_{SH}$. In this case, if the shift position $P_{SH}$ of the transmission 18 is the P-position, the PM-HV-ECU 104 outputs to the P-ECU 106 a P-release switching request signal for switching the shift position $P_{SH}$ of the transmission 18 from the P-position to a non-P-position based on the shift-lever position signal. The PM-HV-ECU 104 outputs to the P-ECU 106 a P-lock switching request signal for switching the shift position $P_{SH}$ of the transmission 18 from a non-P-position to the P-position based on the P-switch signal from the P-switch 34. The PM-HV-ECU 104 outputs to the meter-ECU 108 a shift position display signal for displaying the state of the shift position $P_{SH}$. The PM-HV-ECU 104 outputs to the P-switch 34 the parking lock display control command signal (P-lock display control command signal) for displaying the P-lock state (P-position) based on the P-lock state signal indicative of the P-position from the P-ECU 106 and turns on the P-position indicator lump 62 in the P-switch 34 to clearly indicate the P-lock state.

The electric storage device 52 is a chargeable/dischargeable direct-current power source and consists of, for example, a secondary battery such as nickel-hydride and lithium-ion. For example, at the time of vehicle acceleration running or motor running, accumulated electric power is supplied through an inverter 54 to the electric motor M for running. At the time of regenerative braking during vehicle deceleration running, electric power generated by the electric motor M for running is accumulated through the inverter 54 into the electric storage device 52.

The P-ECU 106 controls the drive of the parking lock device 16 and actuates or releases the parking lock so as to switch the shift position $P_{SH}$ between the P-position and a non-P-position based on the automatic P-lock switching request signal and the P-switching request signal (P-lock switching request signal or P-release switching request signal) from the PM-HV-ECU 104, for example. The P-ECU 106 determines whether the shift position $P_{SH}$ of the transmission 18 is the P-position or a non-P-position based on the P-position signal indicative of the actuation state of the parking lock from the parking lock device 16 and outputs the determination result as the P-lock state signal to the PM-HV-ECU 104 etc.

When the power-supply switching state of the vehicle 10 is switched from the ALL-OFF state or the ACC-ON state to the IG-ON state or the READY-ON state, as described later, the P-ECU 106 provides the initial drive control in the parking lock device 16 and provides detection control of a P-wall position and a non-P-wall position for properly acquiring the P-position signal and the non-P-position signal. Before executing a sequence of the initial controls in the parking lock device 16 when the power-supply switching state of the vehicle 10 is switched from the ALL-OFF state or the ACC-ON state to the IG-ON state or the READY-ON state, the P-ECU 106 executes the initial process (initial process) of the P-ECU 106 itself. The P-ECU 106 is put into a deactivated state if the power-supply switching state of the vehicle 10 is the ALL-OFF state or the ACC-ON state, and is put into an activated state if the power-supply switching state of the vehicle 10 is the IG-ON state or the READY-ON state. The deactivated state of the P-ECU 106 is, for example, a state in which the P-ECU 106 is powered off and the activated state of the P-ECU 106 is a state in which the P-ECU 106 is powered on.

The meter-ECU 108 outputs the vehicle speed display control command signal for displaying the current vehicle speed V to the speed meter 58 in the combination meter 56 to display the current vehicle speed V. For example, the meter-ECU 108 determines a vehicle speed signal V for meter display by counting (counting) a rectangular waveform of a vehicle speed pulse signal based on a wheel speed pulse signal output from the wheel speed sensor 42. The meter-ECU 108 actuates the speed meter 58 based on the determined meter display vehicle speed signal V, thereby lighting corresponding segments to display the current vehicle speed V. The meter-ECU 108 output to the shift position indicator 60 in the combination meter 56 a shift position display control command signal for displaying the state of the shift position $P_{SH}$ based on a shift position display signal output from the PM-HV-ECU 104 to display the current state of the shift position $P_{SH}$ on the shift position indicator 60. For example, the meter-ECU 108 lights a corresponding indication position of the shift position $P_{SH}$ on the shift position indicator 60.

Figure 2:
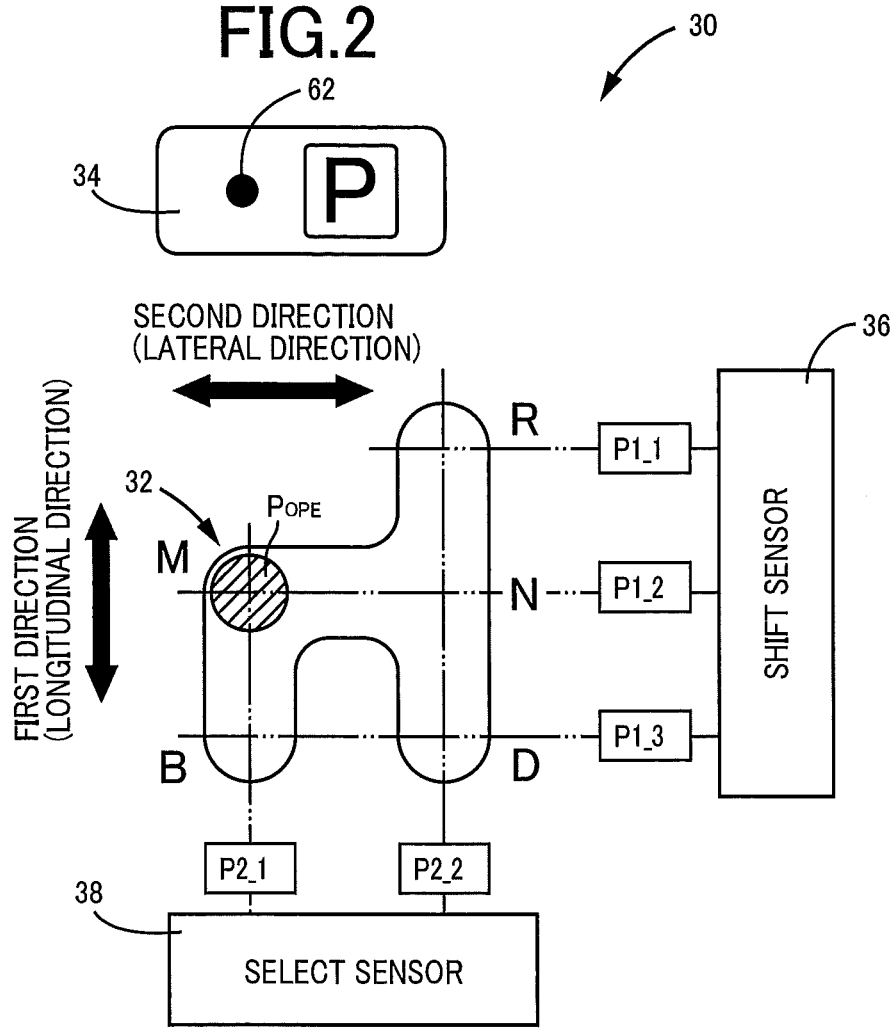
FIG. 2 is a diagram of an example of the shift operating device as a switching device (operating device) switching a plurality of types of the shift positions in the transmission included in the vehicle of FIG. 1 with artificial operation.

FIG. 2 is a diagram of an example of the shift operating device 30 as a switching device (operating device) switching a plurality of types of the shift positions $P_{SH}$ in the transmission 18 with artificial operation. The shift operating device 30 includes the shift lever 32 disposed near a driver's seat, for example, and acting as a momentary operator operated to a plurality of the operation positions $P_{OPE}$, i.e., an automatically returning operator automatically returning to an original position (initial position) when an operation force is canceled. The shift operating device 30 of this embodiment includes the P-switch 34 as another switch near the shift lever 32 acting as a momentary operator for achieving the parking lock of the shift position $P_{SH}$ of the transmission 18 at the parking position (P-position).

The shift lever 32 is operated to each of three operation positions $P_{OPE}$ disposed in the front-back direction or up-down direction, i.e., the longitudinal direction, of a vehicle, as depicted in FIG. 2, which are an R-operation position (R-operation position), an N-operation position (N-operation position), and a D-operation position (D-operation position) as well as an M-operation position (M-operation position) and B-operation position (B-operation position) arranged in parallel therewith, and outputs the shift lever position signal corresponding to the operation position $P_{OPE}$ to the PM-HV-ECU 104. The shift lever 32 can be operated in the longitudinal direction between the R-operation position, the N-operation position, and the D-operation position, can be operated in the longitudinal direction between the M-operation position and the B-operation position, and can further be operated in the lateral direction of the vehicle orthogonal to the longitudinal direction between the N-operation position and the B-operation position.

The P-switch 34 is a momentary push-button switch, for example, and outputs the P-switch signal to the PM-HV-ECU 104 each time a user performs a push-in operation. For example, if the P-switch 34 is pushed when the shift position $P_{SH}$ of the transmission 18 is a non-P position, the shift position $P_{SH}$ is set to the P-position by the P-ECU 106 based on the P-lock switching request signal from the PM-HV-ECU 104 given that a predetermined condition such as a vehicle speed V equal to or lower than a P-lock permission vehicle speed Vp is satisfied. The P-position is a parking position at which the power transmission path is interrupted in the transmission 18 while the parking lock device 16 performs the parking lock to mechanically prevent the rotation of the drive wheels 14. The P-switch 34 has the P-position indicator lump 62 built-in and if the P-lock state signal from the P-ECU 106 indicates the P-position, the PM-HV-ECU 104 lights the P-position indicator lump 62.

The M-operation position of the shift operating device 30 is the initial position (home position) of the shift lever 32 and, even if a shift operation is performed to the operation positions $P_{OPE}$ (R-, N-, D-, and B-operation positions) other than the M-operation position, when a driver releases the shift lever 32, i.e., an external force acting on the shift lever 32 disappears, the shift lever 32 returns to the M-operation position due to a mechanical mechanism such as a spring. When the shift operating device 30 is shift-operated to each of the operation positions $P_{OPE}$, the PM-HV-ECU 104 makes the switch to the shift position $P_{SH}$ corresponding to the operation position $P_{OPE}$ after the shift operation based on the shift lever position signal corresponding to the operation position $P_{OPE}$, and the shift position indicator 60 displays the current operation position $P_{OPE}$, i.e., the state of the shift position $P_{SH}$ of the transmission 18.

Describing the shift positions $P_{SH}$, an R-position selected by the shift operation of the shift lever 32 to the R-operation position is a backward running position at which a drive force causing a vehicle to run backward is transmitted to the drive wheels 14. A neutral position (N-position) selected by the shift operation of the shift lever 32 to the N-operation position is a neutral position for achieving a neutral state, in which the power transmission path in the transmission 18 is interrupted. A D-position selected by the shift operation of the shift lever 32 to the D-operation position is a forward running position at which a drive force causing a vehicle to run forward is transmitted to the drive wheels 14. For example, if the PM-HV-ECU 104 determines that the shift operation is performed to a predetermined operation position $P_{OPE}$ (specifically, the R-operation position, the N-operation position, or the D-operation position) at which the movement prevention (parking lock) of the vehicle is canceled based on the shift lever position signal when the shift position $P_{SH}$ is the P-position, the PM-HV-ECU 104 outputs to the P-ECU 106 a P-cancel switching request signal cancelling the parking lock given that a predetermined condition such as the brake-on state $B_{ON}$ is satisfied. The P-ECU 106 outputs the P-switching control command signal canceling the parking lock to the parking lock device 16 based on the P-cancel switching request signal from the PM-HV-ECU 104 to cancel the parking lock. The PM-HV-ECU 104 makes the switch to the shift position $P_{SH}$ corresponding to the operation position $P_{OPE}$ after the shift operation.

A B-position selected by the shift operation of the shift lever 32 to the B-operation position is a deceleration forward running position (engine brake range) at which engine brake effect is exerted by, for example, the regenerative braking causing the electric motor M for running to generate a regenerative torque at the D-position to decelerate the rotation of the drive wheels 14. Therefore, the PM-HV-ECU 104 disables the shift operation even if the shift lever 32 is shift-operated to the B-operation position when the current shift position $P_{SH}$ is a shift position $P_{SH}$ other than the D-position and enables the shift operation to the B-operation position only in the case of the D-position. For example, even if a driver performs a shift operation to the B-operation position during the P-position, the shift position $P_{SH}$ remains at the P-position.

Since the shift lever 32 returns to the M-operation position when the external force acting thereon disappears in the shift operating device 30 of this embodiment, the shift position $P_{SH}$ being selected cannot be recognized by only visually recognizing the operation position $P_{OPE}$ of the shift lever 32. Therefore, the shift position indicator 60 is disposed at an easily viewable position for a driver to display on the shift position indicator 60 the shift position $P_{SH}$ being selected including the P-position.

This embodiment employs a so-called shift-by-wire (SBW) mode and, since the shift operating device 30 is two-dimensionally shift-operated in a first direction P1 that is the longitudinal direction and a second direction P2 that is the lateral direction intersecting with (in FIG. 2, orthogonal to) the direction P1, the shift operating device 30 includes the shift sensor 36 as a first-direction detecting portion detecting a shift operation in the first direction P1 and the select sensor 38 as a second-direction detecting portion detecting a shift operation in the second direction P2, so as to output the operation position $P_{OPE}$ as a detection signal of a position sensor to the vehicle control device 100. Each of the shift sensor 36 and the select sensor 38 outputs to the vehicle control device 100 a voltage as a detection signal (shift lever position signal) corresponding to the operation positions $P_{OPE}$, and the vehicle control device 100 recognizes (judges) the operation position $P_{OPE}$ based on the detection signal voltages. Therefore, it can be said that the first-direction detecting portion (the shift sensor 36) and the second-direction detecting portion (the select sensor 38) make up an operation position detecting portion detecting the operation position $P_{OPE}$ of the shift operating device 30 as a whole.

Describing one example of the recognition of the operation positions $P_{OPE}$, a detection signal voltage $V_{SH}$ of the shift sensor 36 turns to voltage levels (e.g., voltages within a low-range, a mid-range, and a high-range) corresponding to the positions of a first-direction first position P1_1 indicative of the R-operation position, a first-direction second position P1_2 indicative of the M-operation position or the N-operation position, and a first-direction third position P1_3 indicative of the B-operation position or the D-operation position. A detection signal voltage $V_{SL}$ of the select sensor 38 turns to voltage levels (e.g., voltages within a low-range and a high-range) corresponding to the positions that are a second-direction first position P2_1 indicative of the M-operation position or the B-operation position and a second-direction second position P2_2 indicative of the R-operation position, the N-operation position, or the D-operation position. The PM-HV-ECU 104 detects the detection signal voltages $V_{SH}$ and $V_{SL}$, changing in this way to recognize the operation positions $P_{OPE}$ (R-, N-, D-, M-, and B-operation positions) from the combinations of the voltage levels.

Figure 3:
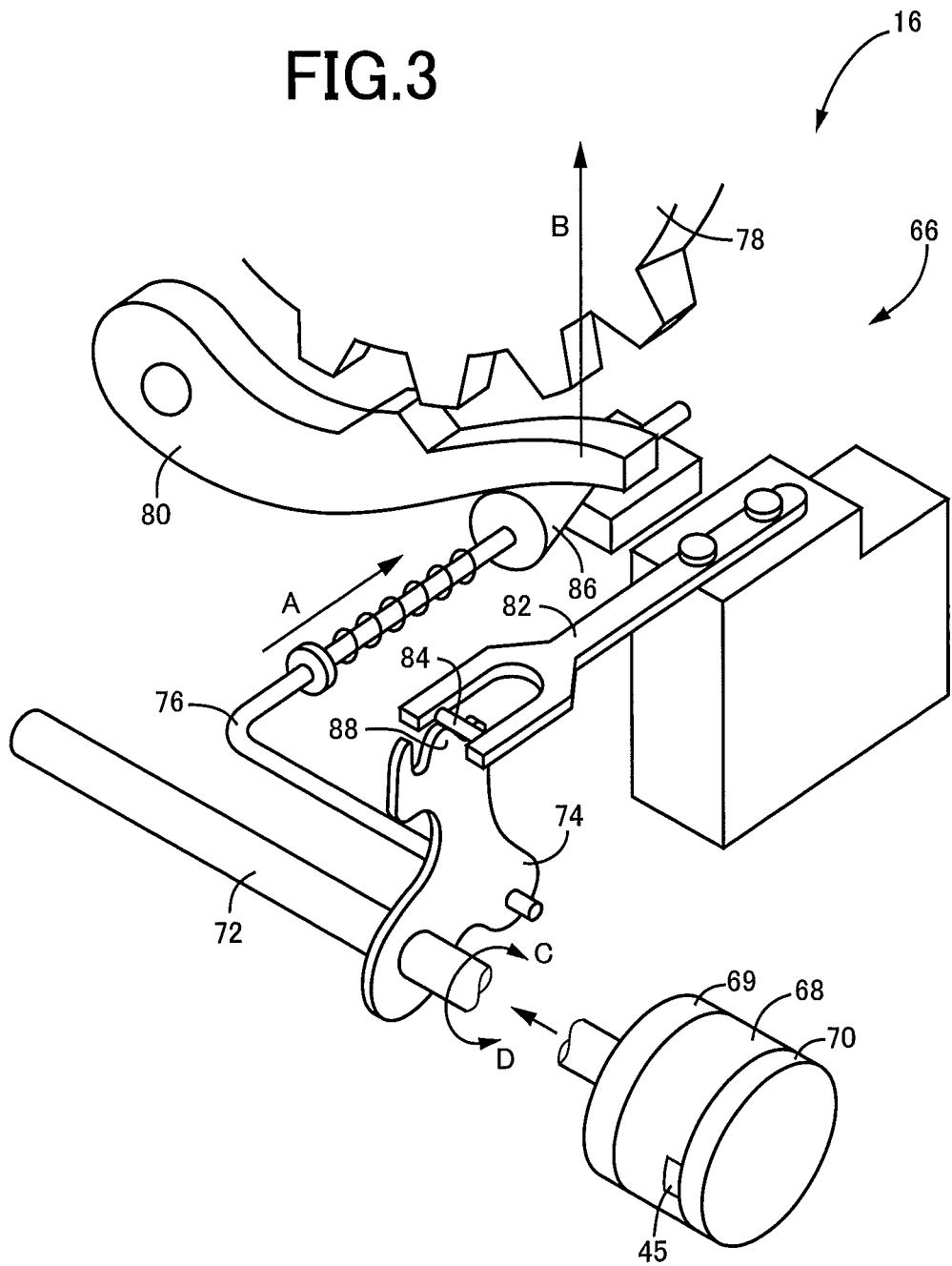
FIG. 3 is a diagram for explaining a configuration of the parking lock device mechanically preventing the rotation of the drive wheels in the vehicle of FIG. 1.

FIG. 3 is a diagram for explaining a configuration of the parking lock device 16 mechanically preventing the rotation of the drive wheels 14. In FIG. 3, the parking lock device 16 includes a P-lock mechanism (parking lock mechanism) 66, a P-lock drive motor (parking lock drive motor) 68 that is an electric-powered actuator, a P-lock reduction gear 69, and an encoder 70 and is actuated for preventing the vehicle 10 from moving based on the control signal from the vehicle control device 100.

Figure 4:
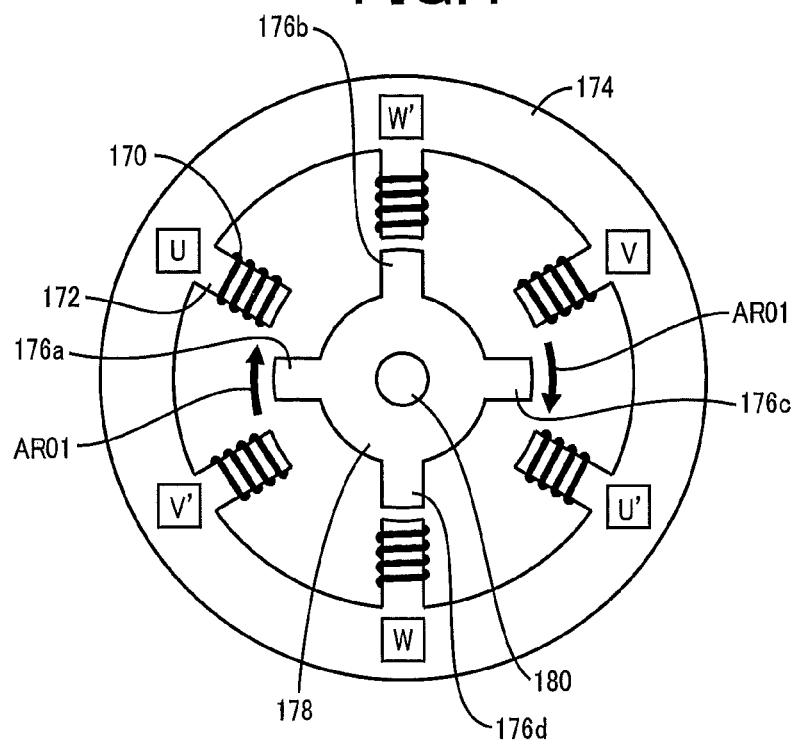
FIG. 4 is a schematic cross-sectional view of a cross-sectional structure of the P-lock drive motor provided in the parking lock device of FIG. 3.

The P-lock drive motor 68 is coupled via the P-lock reduction gear 69 to a shaft 72 and drives the P-lock mechanism 66 through the shift-by-wire system in response to the command (control signal) from the P-ECU 106. The P-lock drive motor 68 corresponds to an electric motor of the present invention, includes a stator 174 having a plurality of salient poles 172 having windings 170 wound therearound and a rotor 178 disposed rotatably relative to the stator 174 and having a plurality of salient poles 176a, 176b, 176c, and 176d (simply referred to as salient poles 176 if not particularly distinguished), and is a motor rotating the rotor 178 by sequentially supplying a current to the windings 170 based on rotation position information (rotation angle) of the rotor 178. Although the form of the P-lock drive motor 68 is not particularly limited, the P-lock drive motor 68 of this embodiment is a switched reluctance motor (SR motor). Therefore, the P-lock drive motor 68 has a simple motor structure and is inexpensive and mechanically reliable and, since the rotor 178 has no winding, advantageously, the rotor 178 causes no heat generation problem. FIG. 4 is a schematic cross-sectional view of a cross-sectional structure of the P-lock drive motor 68. In the P-lock drive motor 68, the stator 174 is a non-rotating member fixed to a vehicle body etc.; the rotor 178 is rotatable relative to the stator 174 around the shaft center of the stator 174; and rotation of a motor output shaft 180 integrally rotating with the rotor 178 is transmitted via the P-lock reduction gear 69 to the shaft 72. For example, in the positional relationship between the stator 174 and the rotor 178 depicted in FIG. 4, the energization of the windings 170 at U- and U'-positions (U- and U'-phases) generates a magnetic force and the salient poles 176a and 176c of the rotor 178 are attracted by the salient poles 172 of the stator 174 at the U- and U'-positions, rotating the rotor 178 in the direction of arrows AR01. When the rotor 178 rotates to a rotor rotation position where the salient poles 172 of the stator 174 and the salient poles 176a and 176c of the rotor 178 are opposed to each other at the U- and U'-positions, or a rotor rotation position close to this rotation position, the energization of the windings 170 is switched from the U- and U'-positions to V- and V'-positions (V- and V'-phases). As a result, the salient poles 176b and 176d of the rotor 178 are attracted by the salient poles 172 of the stator 174 at the V- and V'-positions, continuing the rotation of the rotor 178 in the direction of the arrows AR01. The P-ECU 106 can sequentially switch the energization of the windings 170 based on the rotation angle of the rotor 178 relative to the stator 174 in this way to rotationally drive the P-lock drive motor 68. The P-ECU 106 acquires the rotation angle of the rotor 178 relative to the stator 174 during the rotational drive, i.e., the rotation position information of the rotor 178 based on a signal from the encoder 70. When the windings 170 are energized, an applied voltage $V_{MR}$ applied to the windings 170 is defined in advance such that the P-lock drive motor 68 outputs an appropriate motor torque (output torque) $T_{SR}$ at normal temperature, for example, and, therefore, the supply current to the windings 170 is determined by the relationship between a resistance value of the windings 170 and the applied voltage $V_{MR}$. The applied voltage $V_{MR}$ is set to a constant value or a substantially constant value. Therefore, the motor torque $T_{SR}$ based on the supply current to the windings 170 tends to increase as the resistance value of the windings 170 decreases.

Returning to FIG. 3, the P-lock reduction gear 69 is a reduction gear reducing and transmitting the rotation of the P-lock drive motor 68 to the shaft 72. For example, the P-lock decelerator 69 is a cycloidal reduction gear and has a reduction ratio such that one rotation of the P-lock drive motor 68 causes 1/60 rotation of the shaft 72.

The encoder 70 is, for example, a rotary encoder outputting signals of an A-phase, a B-phase, and a Z-phase, integrally rotates with the P-lock drive motor 68 to detect the rotation status of the SR motor, and supplies to the P-ECU 106 a signal indicative of the rotation status, i.e., a pulse signal for acquiring a counted value (encoder count) corresponding to a movement amount (rotation amount) of the P-lock drive motor 68.

The P-ECU 106 acquires the signal supplied from the encoder 70 and comprehends the rotation status of the SR motor, i.e., the rotation position information of the rotor 178 to control the energization for driving the SR motor.

The P-lock mechanism 66 includes the shaft 72 rotationally driven by the P-lock drive motor 68, a detent plate 74 rotating with the rotation of the shaft 72, a rod 76 operating with the rotation of the detent plate 74, a parking gear 78 rotating in conjunction with the drive wheels 14, a parking lock pole 80 for preventing the rotation of (locking) the parking gear 78, a detent spring 82 limiting the rotation of the detent plate 74 and fixing the shift position $P_{SH}$, and a roller 84. Although the parking gear 78 is not limited in terms of the location of the disposition as long as the drive wheels 14 are locked when the parking gear 78 is locked, the parking gear 78 is concentrically fixed to the output gear 22 of the transmission 18 (see FIG. 1), for example.

The detent plate 74 is operably coupled via the shaft 72 and the P-lock reduction gear 69 to a drive shaft of the P-lock drive motor 68 and acts as a parking lock positioning member driven by the P-lock drive motor 68 along with the rod 76, the detent spring 82, the roller 84, etc., so as to make the switch between a parking lock position corresponding to the P-position and a non-parking lock position corresponding to the shift positions $P_{SH}$ (non-P positions) other than the P-position. The shaft 72, the detent plate 74, the rod 76, the detent spring 82, and the roller 84 act as a parking lock switching mechanism.

FIG. 3 depicts the non-parking lock position, i.e., a state when the shift position $P_{SH}$ is a non-P position. In this state, the parking lock pole 80 does not put the parking gear 78 into the locked state and, therefore, the rotation of the drive wheels 14 is not prevented by the P-lock mechanism 66. If the shaft 72 is rotated from this state by the P-lock drive motor 68 in the direction of an arrow C depicted in FIG. 3, the rod 76 is pushed via the detent plate 74 in the direction of an arrow A depicted in FIG. 3, and the parking lock pole 80 is pushed up by a tapered member 86 disposed at the leading end of the rod 76 in the direction of an arrow B depicted in FIG. 3. As the detent plate 74 rotates, the roller 84 of the detent spring 82 located in one of two valleys disposed at the top portion of the detent plate 74, i.e., at a non-parking lock position 90 (hereinafter, non-P-position 90 (see FIG. 5)), climbs over a peak 88 and moves to the other valley, i.e., a parking lock position 92 (hereinafter, P-position 92 (see FIG. 5)). The roller 84 is disposed rotatably around the shaft center thereof on the detent spring 82. When the detent plate 74 is rotated until the roller 84 comes to the P-position 92, the parking lock pole 80 is pushed up to a position causing engagement with the parking gear 78. As a result, the rotation of the drive wheels 14 rotating in conjunction with the parking gear 78 is mechanically prevented and the shift position $P_{SH}$ is switched to the P-position. To reduce a load applied to the P-lock mechanism 66 such as the detent plate 74, the detent spring 82, and the shaft 72 when the shift position $P_{SH}$ is switched between the P-position and the non-P positions in the parking lock device 16, the P-ECU 106 controls a rotation amount of the P-lock drive motor 68 such that the impact is reduced when the roller 84 of the detent spring 82 climes over the peak 88 and falls, for example. It can be said in the parking lock device 16 that when the roller 84 is located at the P-position 92, the switching position is the lock position (P-position) restraining the rotation of the drive wheels (wheels) 14 and that when the roller 84 is located at the non-P-position 90, the switching position is the unlock position (non-P-position) not restraining the rotation of the drive wheels (wheels) 14.

As described above, the parking lock device 16 has the switching position of the parking lock device 16 selectively switched between the lock position and the unlock position by the drive of the P-lock drive motor 68 based on the command from the P-ECU 106. In other words, the parking lock device 16 selectively switches the vehicle 10 based on the operation of the driver between the locked state (P-lock state) in which the parking lock pole 80 acting as a locking tooth engages with the parking gear 78 acting as rotating teeth rotating with the wheels (drive wheels 14) and the unlocked state (non-P-lock state) achieved by releasing the locked state.

Figure 5:
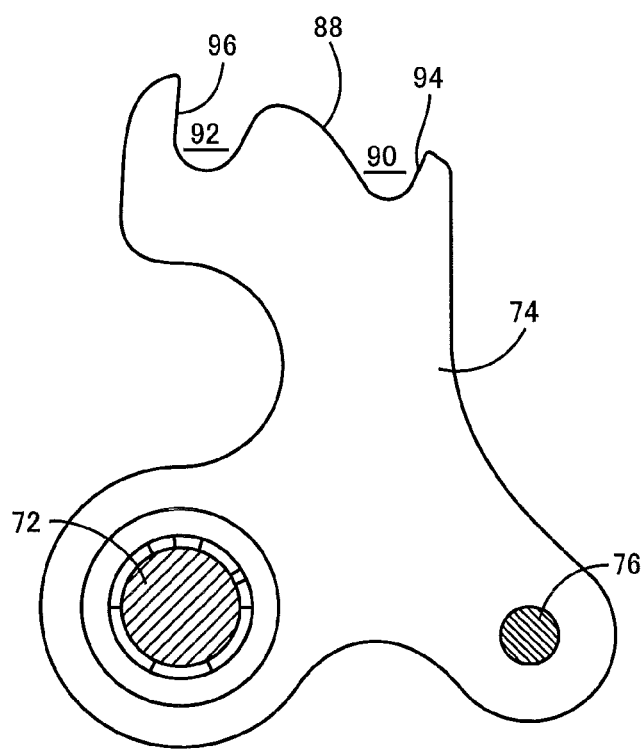
FIG. 5 is a diagram for explaining a configuration of the detent plate included in the parking lock device of FIG. 3.

FIG. 5 is a diagram for explaining a configuration of the detent plate 74. A surface of each valley positioned further from the peak 88 is referred to as a wall. Therefore, the walls are located at positions colliding with the roller 84 when the roller 84 of the detent spring 82 climbs over the peak 88 and falls into the valleys while the P-ECU 106 does not provide the following control. The wall at the P-position 92 is referred to as a "P-wall" and the wall at the non-P-position 90 is referred to as a "non-P-wall". When the roller 84 moves from the P-position 92 to the non-P-position 90, the P-ECU 106 controls the P-lock drive motor 68 such that the non-P-wall 94 does not collide with the roller 84. Specifically, the P-ECU 106 stops the rotation of the P-lock drive motor 68 at a position before the non-P-wall 94 collides with the roller 84. This position is referred to as a "non-P-target rotation position". When the roller 84 moves from the non-P-position 90 to the P-position 92, the P-ECU 106 controls the P-lock drive motor 68 such that the P-wall 96 does not collide with the roller 84. Specifically, the P-ECU 106 stops the rotation of the P-lock drive motor 68 at a position before the P-wall 96 collides with the roller 84. This position is referred to as a "P-target rotation position". The control of the P-lock drive motor 68 by the P-ECU 106 can significantly reduce the load applied to the P-lock mechanism 66 such as the detent plate 74, the detent spring 82, and the shaft 72 at the time of switch of the shift position $P_{SH}$. By reducing the load, the P-lock mechanism 66 can also be reduced in weight and cost.

Figure 6:
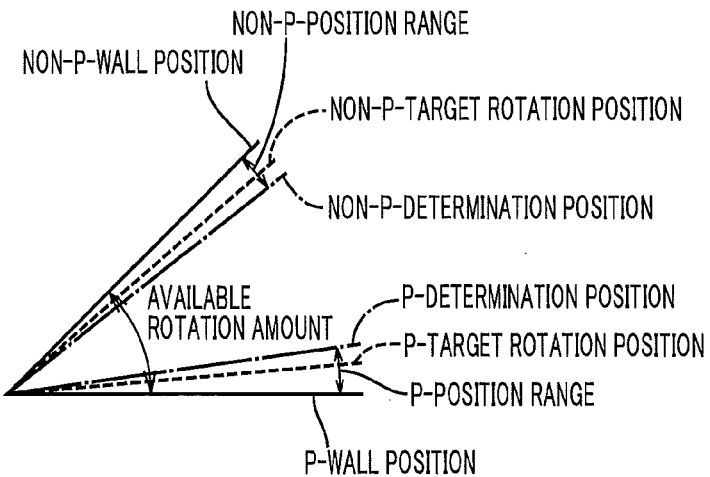
FIG. 6 is a diagram for explaining correlation between a rotation amount of the P-lock drive motor included in the parking lock device in the parking lock device of FIG. 3, i.e., the encoder count, and the shift position.

FIG. 6 is a diagram for explaining correlation between a rotation amount of the P-lock drive motor 68, i.e., the encoder count, and the shift position $P_{SH}$. The P-lock drive motor 68 rotationally drives the detent plate 74 and the rotation amount of the P-lock drive motor 68 is regulated by the non-P-wall 94 and the P-wall 96. FIG. 6 conceptually depicts the position of the P-wall 96 (P-wall position) and the position of the non-P-wall 94 (non-P-wall position) when the rotational control of the P-lock drive motor 68 is provided. An available rotation amount of the P-lock drive motor 68 is defined from the P-wall position to the non-P-wall position. Each of a P-determination position and a non-P-determination position depicted in FIG. 6 is a predetermined position of the detent plate 74 at which the switch of the shift position $P_{SH}$ is determined. Therefore, a P-position range is from the P-determination position to the P-wall position, and a non-P-position range is from the non-P-determination position to the non-P-wall position. If the rotation amount of the P-lock drive motor 68 detected by the encoder 70 is within the P-position range, it is determined that the shift position $P_{SH}$ is the P-position while if the rotation amount of the P-lock drive motor 68 is within the non-P-position range, it is determined that the shift position $P_{SH}$ is a non-P-position. If the rotation amount of the P-lock drive motor 68 falls between the P-determination position and the non-P-determination position, it is determined that the shift position $P_{SH}$ is indefinite or that the shift position $P_{SH}$ is being switched. The above determination is made by the P-ECU 106.

As depicted in FIG. 6, the P-target rotation position is set within the P-position range and the non-P-target rotation position is set within the non-P-position range. The P-target rotation position is a position at which the P-wall 96 does not collide with the roller 84 of the detent spring 82 at the time of switch from the non-P-position to the P-position and is determined with a predetermined margin from the P-wall position. This predetermined margin is set with allowance in consideration of rattle due to a temporal change etc. As a result, the temporal change can be absorbed for a certain number of uses and the collision between the P-wall 96 and the roller 84 can be avoided when the shift position $P_{SH}$ is switched from the non-P-position to the P-position. Similarly, the non-P-target rotation position is a position at which the non-P-wall 94 does not collide with the roller 84 of the detent spring 82 at the time of switch from the P-position to a non-P-position and is determined with a predetermined margin from the non-P-wall position. This predetermined margin is set with allowance in consideration of rattle due to a temporal change etc. As a result, the temporal change can be absorbed for a certain number of uses and the collision between the non-P-wall 94 and the roller 84 can be avoided when the shift position $P_{SH}$ is switched from the P-position to the non-P-position. The margin from the non-P-wall position and the margin from the P-wall position may not be the same and may be different from each other depending on a shape of the detent plate 74.

In the parking lock device 16 configured as described above, the P-ECU 106 acquires the encoder count corresponding to the rotation amount of the P-lock drive motor 68 based on the pulse signal output from the encoder 70. For example, when the power-supply switching state of the vehicle 10 is the ALL-OFF state or the ACC-ON state, the P-ECU 106 sets the encoder count to zero and, when the ALL-OFF state or the ACC-ON state is switched to the IG-ON state or the READY-ON state, the encoder count is sequentially updated based on the subsequent signal output from the encoder 70. In this embodiment, the encoder count due to the rotation toward the P-wall position (rotation in the direction of the arrow C of FIG. 3) is set to be negative. The P-ECU 106 controls the P-lock drive motor 68 such that the acquired encoder count is made equal to a preset target encoder count (target count value, target counted value). This target count value is a target value empirically obtained and set for stopping the P-lock drive motor 68 at the P-target rotation position and the non-P-target rotation position, for example.

The correlation between the rotation amount of the P-lock drive motor 68 and the shift position $P_{SH}$ has been described. Since the encoder 70 is a relative position sensor and the P-ECU 106 loses the information of the absolute position of the P-lock drive motor 68, i.e., the P-wall position and the non-P-wall position, in the deactivated state, if the P-ECU 106 is switched from the deactivated state to the activated state, the P-ECU 106 must comprehend the absolute position of the P-lock drive motor 68. A method of providing the position control of the P-lock drive motor 68 by using the encoder 70 detecting relative position information will hereinafter specifically be described.

Figure 7:
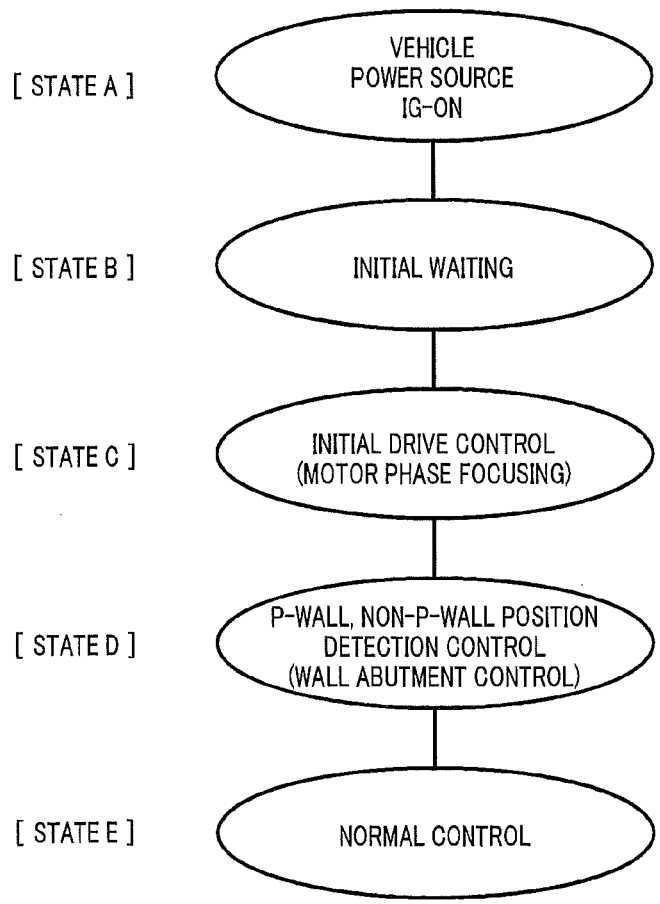
FIG. 7 is a state transition diagram for explaining a sequence of the initial controls in the parking lock device when the power-supply switching state of the vehicle of FIG. 1 is switched from the ALL-OFF state or the ACC-ON state to the IG-ON state and the P-ECU is switched from the deactivated state to the activated state.

FIG. 7 is a state transition diagram for explaining a sequence of the initial controls in the parking lock device 16 when the switch operation of the vehicle power switch 40 is performed to switch the power-supply switching state of the vehicle 10 from the ALL-OFF state or the ACC-ON state to the IG-ON state and the P-ECU 106 is switched from the deactivated state to the activated state. In FIG. 7, when the PM-HV-ECU 104 switches the power-supply switching state of the vehicle 10 from the ALL-OFF state or the ACC-ON state to the IG-ON state [State A], the P-ECU 106 is switched from the deactivated state to the activated state and enters into initial waiting that is a waiting period until relay of the P-lock drive motor 68 (P-motor power-supply relay) is connected [State B]. In State B, for example, the P-ECU 106 executes an initial process of the P-ECU 106 itself. The P-ECU 106 then provides initial drive control of the P-lock drive motor 68 such as matching of excitation (phase focusing) for properly controlling the rotation of the P-lock drive motor 68 [State C]. The P-ECU 106 then detects the P-wall position or the non-P-wall position of the P-lock drive motor 68 to set a reference position [State D]. After setting the reference position, the P-ECU 106 provides normal control to actuate or release the parking lock based on an operation of the P-switch 34 or a shift operation by a user, for example [State E]. Even if the switch operation of the vehicle power switch 40 is performed to switch the power-supply switching state of the vehicle 10 from the ALL-OFF state or the ACC-ON state to the READY-ON state and the P-ECU 106 is switched from the deactivated state to the activated state, a sequence of the initial controls in the parking lock device 16 is the same as FIG. 7; however, after the controls or processes are normally completed to State E of FIG. 7, the power-supply switching state is switched to the READY-ON state. Electric motor heat generation control according to the present invention may be provided during transition from State C to State D of FIG. 7 and this will be described later with reference to a functional block diagram of FIG. 10 and a flowchart of FIG. 12. The initial drive control of the P-lock drive motor 68 provided in State C of FIG. 7 will hereinafter be described.

The initial drive control of the P-lock drive motor 68 is control provided by the P-ECU 106 if the P-ECU 106 is switched from the deactivated state to the activated state and the P-lock drive motor 68 is energized to allow the P-ECU 106 to recognize the relative positional relationship between the rotor 178 and the stator 174 of the P-lock drive motor 68. Although various specific control methods are conceivable as the initial drive control, for example, the P-ECU 106 provides the initial drive control by first energizing the windings 170 of both the U- and U'-phases and the V- and V'-phases depicted in FIG. 4 for a certain time period and then shutting off the energization of the V- and V'-phases while continuing the energization of the U- and U'-phases for a certain time period. As a result, since the rotor 178 is moved to the rotation position at which the salient poles 176 of the rotor 178 are opposed to the salient poles 172 of the stator 174 at the U- and U'-phases, the P-ECU 106 can recognize the relative positional relationship between the rotor 178 and the stator 174. The control method of detecting the P-wall position and the non-P-wall position in State D of FIG. 7 will be described.

Figure 8:
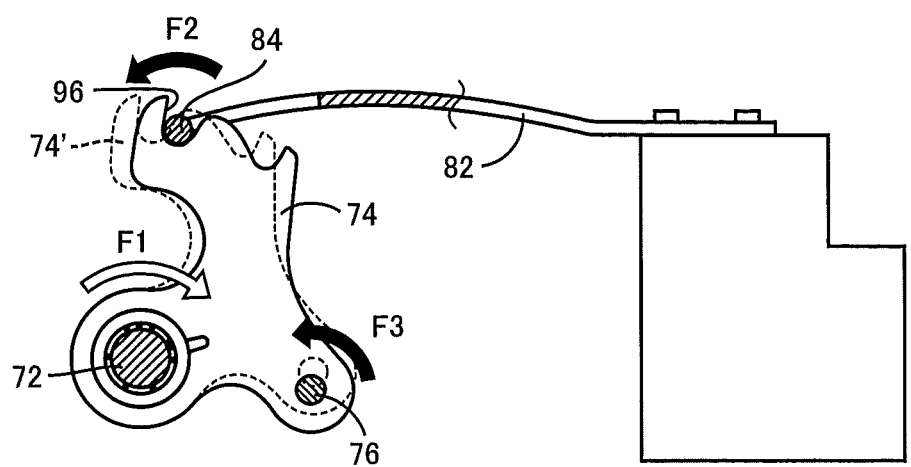
FIG. 8 is a diagram for explaining the control method of detecting the P-wall position in the P-wall position detection control provided by the P-ECU of FIG. 1.

FIG. 8 is a diagram for explaining the control method of detecting the P-wall position. In the P-wall position detection control, the P-ECU 106 first drives the P-lock drive motor 68 to rotate the detent plate 74 in the direction of the arrow C depicted in FIG. 3, i.e., the direction causing the P-wall 96 to move toward the roller 84 of the detent spring 82, making contact between the roller 84 and the P-wall 96. At the P-position 92, i.e., the P-position that is a predetermined shift position $P_{SH}$, the P-wall 96 acts as a regulating member regulating the rotation in the direction of the arrow C depicted in FIG. 3 that is a predetermined direction of the P-lock drive motor 68. The P-wall 96 may make up a regulating member in cooperation with the detent spring 82 and the roller 84. In FIG. 8, an arrow F1 indicates a rotation force due to the P-lock drive motor 68; an arrow F2 indicates a spring force due to the detent spring 82; and an arrow F3 indicates a push-back force due to the rod 76. A detent plate 74' depicted with a dot-line indicates a position of the contact between the P-wall 96 and the roller 84. Therefore, the detection of the position of the detent plate 74' corresponds to the detection of the position of the P-wall 96.

After the contact between the P-wall 96 and the roller 84, the detent plate 74 is rotated from the position indicated by the dot-line in the direction of the arrow C depicted in FIG. 3 by the rotation force F1 of the P-lock drive motor 68 against the spring force of the detent spring 82. Since this causes bending of the detent spring 82, the spring force F2 increases and the push-back force F3 of the rod 76 also increases. When the rotation force F1 is balanced with and the spring force F2 and the push-back force F3, the rotation of the detent plate 74 is stopped.

The P-ECU 106 determines the stop of rotation of the detent plate 74 based on the acquired encoder count. For example, if the minimum value or the maximum value of the encoder count is not changed for a predetermined time period, the P-ECU 106 determines the stop of rotation of the detent plate 74 and the P-lock drive motor 68. Which of the minimum value or the maximum value of the encoder count is monitored may be set depending on the encoder 70 and, in either case, the absence of a change in the minimum value or the maximum value for a predetermined time period indicates that the detent plate 74 is no longer moving.

The P-ECU 106 detects the position of the detent plate 74 at the time of stop of rotation as a P-wall position that is provisional (hereinafter referred to as the "provisional P-wall position") and further calculates a bending amount or a bending angle of the detent spring 82. The bending amount or the bending angle is calculated by using a map indicative of relationship of the bending amount or the bending angle corresponding to the applied voltage (supply voltage $V_{MR}$) to the P-lock drive motor 68 stored in advance in the P-ECU 106, for example. The P-ECU 106 calculates the bending amount or the bending angle corresponding to the applied voltage $V_{MR}$ to the P-lock drive motor 68 at the time of detection of the provisional P-wall position from the map.

The P-ECU 106 performs map correction of the provisional P-wall position from the bending amount or the bending angle calculated by using the map and decides the map-corrected position as the P-wall position. At this point, the P-ECU 106 sets the encoder count to CNTP at the decided P-wall position. To turn the encoder count to zero, the P-ECU 106 drives the P-lock drive motor 68 to rotate the detent plate 74 in the direction of the arrow D depicted in FIG. 3, i.e., the direction causing the P-wall 96 to move away from the roller 84 of the detent spring 82 and locates the position of the detent plate 74 at a predetermined P-position. This predetermined P-position is a predetermined position set in advance within the P-position range and is set such that an encoder count difference from the decided P-wall position turns to CNTP. This predetermined P-position may be defined as the P-target rotation position. As described above, the P-target rotation position can be set by deciding the P-wall position. Instead of the map indicative of relationship of the bending amount or the bending angle corresponding to the applied voltage, a map indicative of relationship of the bending amount or the bending angle corresponding to the output torque $T_{SR}$ of the P-lock drive motor 68 may be used or, instead of calculation using the map, a sensor detecting the bending amount or the bending angle may be disposed and used for the detection.

Figure 9:
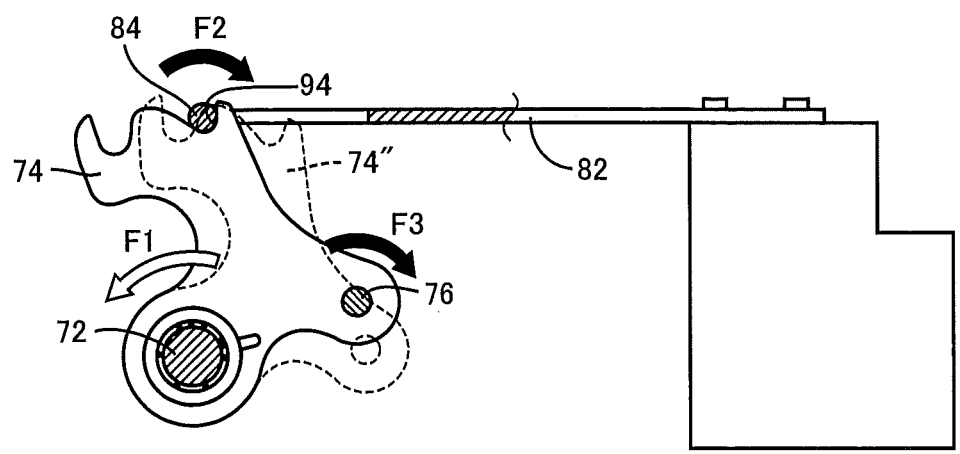
FIG. 9 is a diagram for explaining the control method of detecting the non-P-wall position in the non-P-wall position detection control provided by the P-ECU of FIG. 1.

FIG. 9 is a diagram for explaining the control method of detecting the non-P-wall position. In the non-P-wall position detection control, the P-ECU 106 first drives the P-lock drive motor 68 to rotate the detent plate 74 in the direction of the arrow D depicted in FIG. 3, i.e., the direction causing the non-P-wall 94 to move toward the roller 84 of the detent spring 82, making contact between the roller 84 and the non-P-wall 94. At the non-P-position 90, i.e., a non-P-position that is a predetermined shift position $P_{SH}$, the non-P-wall 94 acts as a regulating member regulating the rotation in the direction of the arrow D depicted in FIG. 3 that is a predetermined direction of the P-lock drive motor 68. The non-P-wall 94 may make up a regulating member in cooperation with the detent spring 82 and the roller 84. In FIG. 9, an arrow F1 indicates a rotation force due to the P-lock drive motor 68; an arrow F2 indicates a spring force due to the detent spring 82; and an arrow F3 indicates a pulling force due to the rod 76. A detent plate 74" depicted with a dot-line indicates a position of the contact between the non-P-wall 94 and the roller 84. Therefore, the detection of the position of the detent plate 74" corresponds to the detection of the position of the non-P-wall 94.

After the contact between the non-P-wall 94 and the roller 84, the detent plate 74 is rotated from the position indicated by the dot-line in the direction of the arrow D depicted in FIG. 3 by the rotation force F1 of the P-lock drive motor 68 against the pulling force of the detent spring 82. Since this causes stretching of the detent spring 82, the spring force F2 increases and the pulling force F3 of the rod 76 also increases. When the rotation force F1 is balanced with the spring force F2 and the pulling force F3, the rotation of the detent plate 74 is stopped.

The P-ECU 106 determines the stop of rotation of the detent plate 74 based on the acquired encoder count. For example, if the minimum value or the maximum value of the encoder count is not changed for a predetermined time period, the P-ECU 106 determines the stop of rotation of the detent plate 74 and the P-lock drive motor 68.

The P-ECU 106 detects the position of the detent plate 74 at the time of stop of rotation as a non-P-wall position that is provisional (hereinafter referred to as the "provisional non-P-wall position") and further calculates a stretching amount of the detent spring 82. The stretching amount is calculated by using a map indicative of relationship of the stretching amount corresponding to the applied voltage to the P-lock drive motor 68 stored in advance in the P-ECU 106, for example. The P-ECU 106 calculates the stretching amount corresponding to the applied voltage to the P-lock drive motor 68 at the time of detection of the provisional non-P-wall position from the map.

The P-ECU 106 performs map correction of the provisional non-P-wall position from the stretching amount calculated by using the map and decides the map-corrected position as the non-P-wall position. The P-ECU 106 sets the encoder count to CNTCP at the decided non-P-wall position. To set the encoder count to an encoder count CP reduced by a predetermined counted value, the P-ECU 106 drives the P-lock drive motor 68 to rotate the detent plate 74 in the direction of the arrow C depicted in FIG. 3, i.e., the direction causing the non-P-wall 94 to move away from the roller 84 of the detent spring 82 and locates the position of the detent plate 74 at a predetermined non-P-position. This predetermined non-P-position is a predetermined position set in advance within the non-P-position range and is set such that an encoder count difference from the decided non-P-wall position turns to a predetermined counted value. This predetermined non-P-position may be defined as the non-P-target rotation position. As described above, the non-P-target rotation position can be set by deciding the non-P-wall position. Instead of the map indicative of relationship of the stretching amount corresponding to the applied voltage, a map indicative of relationship of the stretching amount corresponding to the output torque $T_{SR}$ of the P-lock drive motor 68 may be used or, instead of calculation using the map, a sensor detecting the stretching amount may be disposed and used for the detection.

As described above, in the activated state of the P-ECU 106 with the power-supply switching state of the vehicle 10 turned to the IG-ON state, when the P-lock drive motor 68 is moved in the direction regulating the movement (rotation) of the P-lock drive motor 68, a wall position of the P-lock drive motor 68 corresponding to a predetermined shift position $P_{SH}$ can be detected based on an acquired encoder count to set a reference position. Since both the non-P-wall 94 and the P-wall 96 correspond to mechanical displacement ends (stroke ends) of the parking lock device 16 as depicted in FIGS. 8 and 9, the P-wall position detection control and the non-P-wall position detection control correspond to wall abutment control of the present invention in which the P-lock drive motor 68 drives the parking lock device 16 to the mechanical displacement ends.

As described above, if the switch operation of the vehicle power switch 40 is performed to switch the power-supply switching state of the vehicle 10 to the IG-ON state or the READY-ON state, i.e., when the P-ECU 106 is switched from the deactivated state to the activated state, after the initial process of the P-ECU 106 itself is executed, the initial control in the parking lock device 16 is provided to detect a wall position. In other words, the initial drive control of the P-lock drive motor 68 is provided as the initial control in the parking lock device 16 and, subsequently, the P-wall position and the non-P-wall position of the P-lock drive motor 68 are detected to set the reference positions. Therefore, an actual available rotation amount (actual available rotation amount) of the P-lock drive motor 68 based on the detected P-wall and non-P-wall positions is a range between the two wall positions and can be measured by detecting a wall position by providing the wall position detection control at one shift position $P_{SH}$ and subsequently detecting the other wall position by providing the wall position detection control at the other shift position $P_{SH}$. Since the absolute position of the P-lock drive motor 68 can be comprehended by detecting the wall positions, the target rotation position can be set.

When the temperature of the windings 170 included in the P-lock drive motor 68 is lower, the internal resistance of the windings 170 becomes lower. Since the applied voltage $V_{MR}$ (hereinafter referred to as "electric motor applied voltage $V_{MR}$") to the windings 170 is substantially constant, the supply current to the windings 170 becomes larger when the internal resistance is lower, and the motor torque $T_{SR}$ based on the supply current to the windings 170 becomes larger when the internal resistance of the windings 170 is lower. Therefore, for example, if the vehicle 10 is placed in a very low temperature state, the P-lock drive motor 68 generates a large torque $T_{SR}$ until warmed up by driving etc., of the P-lock drive motor 68 and, therefore, for example, in the P-wall position detection control described in FIG. 8 or the non-P-wall position detection control described in FIG. 9, it is believed that the strength of the P-lock mechanism 66 etc., must be enhanced in accordance with the motor torque $T_{SR}$ in the very low temperature state. However, the enhancement of the strength of the P-lock mechanism 66 etc., on the assumption of the rarely occurring very low temperature state leads to an increase in the cost of the parking lock device 16 and, therefore, control is provided for avoiding this enhancement. A main portion of this control function will be described.

FIG. 10 is a functional block diagram for explaining a main portion of the control function included in the P-ECU 106. As depicted in FIG. 10, the P-ECU 106 includes an activation determining means 130 as an activation determining portion, an electric motor temperature determining means 132 as an electric motor temperature determining portion, an initial drive control means 134 as an initial drive control portion, a wall position detection control means 136 as an wall position detection control portion, a parking lock switching control means 137 as a parking lock switching control portion, and an electric motor heat generation control means 138 as an electric motor heat generation control portion.

The activation determining means 130 determines whether the P-ECU 106 is switched from the deactivated state to the activated state. For example, if the switch operation of the vehicle power switch 40 is performed to switch the power-supply switching state of the vehicle 10 from the ALL-OFF state or the ACC-ON state to the IG-ON state or the READY-ON state, the activation determining means 130 determines that the P-ECU 106 is switched from the deactivated state to the activated state. In short, if State A is achieved in FIG. 7, the activation determining means 130 determines that the P-ECU 106 is switched from the deactivated state to the activated state.

Figure 11A:
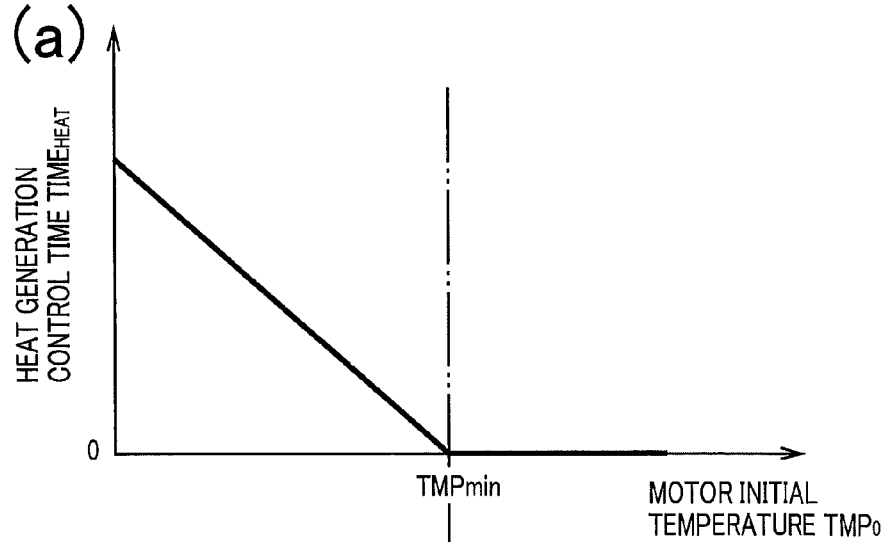
FIG. 11 is a conceptual diagram of relationship between the motor initial temperature and the heat generation control time in the electric motor heat generation control provided by the P-ECU of FIG. 1 and the effect of the provision of the electric motor heat generation control on the motor torque.
Figure 11B:
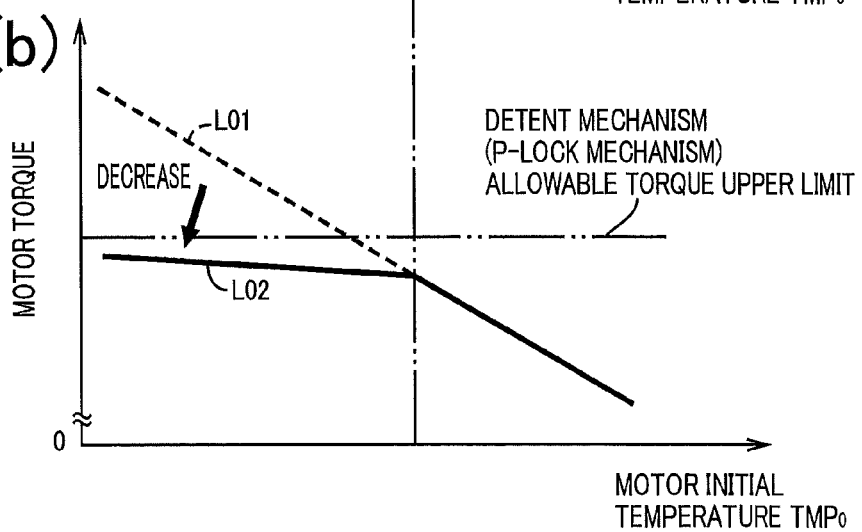

The electric motor temperature determining means 132 determines whether the temperature $TMP_{MR}$ of the P-lock drive motor 68, i.e., the electric motor temperature (motor temperature) $TMP_{MR}$ is lower than a low-temperature determination value TMPmin determined in advance. Although the electric motor temperature determining means 132 detects the motor temperature $TMP_{MR}$ with, for example, the electric motor temperature sensor 45, if a vehicle is not disposed with the electric motor temperature sensor 45, a temperature detected by the vehicle drive device 29, for example, the cooling water temperature $TMP_W$ or the operating oil temperature $TMP_{AT}$ may be considered as the motor temperature $TMP_{MR}$ for the determination. The low-temperature determination value TMPmin is empirically set such that if the motor temperature $TMP_{MR}$ is lower than the value, it is determined the motor torque $T_{SR}$ may become larger to the extent of compromising the durability of the P-lock mechanism 66 etc., due to a reduction of the internal resistance of the windings 170. For example, as depicted in FIG. 11(b) described later, the low-temperature determination value TMPmin is a motor temperature $TMP_{MR}$ set as low as possible such that the motor torque $T_{SR}$ does not exceed an upper limit value of allowable torque of the P-lock mechanism 66 when the P-lock drive motor 68 is driven in the wall abutment control (see State D of FIG. 7) or the normal control (see State E of FIG. 7).

If the activation determining means 130 determines that the P-ECU 106 is switched from the deactivated state to the activated state, the initial drive control means 134 provides the initial drive control of the P-lock drive motor 68 (see State C of FIG. 7). As a result, the relative positional relationship of the rotor 178 and the stator 174 of the P-lock drive motor 68 is recognized.

If the activation determining means 130 determines that the P-ECU 106 is switched from the deactivated state to the activated state, after the initial drive control means 134 completes the provision of the initial drive control, the wall position detection control means 136 (wall abutment control means 136) provides the P-wall position detection control and the non-P-wall position detection control to detect the P-wall position and the non-P-wall position (see State D of FIG. 7). However, if the electric motor heat generation control means 138 described later provides the electric motor heat generation control, i.e., if the electric motor temperature determining means 132 determines that the motor temperature $TMP_{MR}$ is lower than the low-temperature determination value TMPmin before starting the provision of the electric motor heat generation control, the wall position detection control means 136 starts the provision of the P-wall position detection control and the non-P-wall position detection control after the completion of the provision of the electric motor heat generation control.

The parking lock switching control means 137 provides the parking lock switching control of selectively switching the parking lock device 16 between the locked position (P-position) and the unlocked position (non-P-position) in accordance with a command signal from the PM-HV-ECU 104 in the activated state of the P-ECU 106. In particular, after the wall position detection control means 136 completes the provision of the P-wall position detection control and the non-P-wall position detection control, i.e., after the P-wall position and the non-P-wall position are detected, the parking lock switching control means 137 receives the information of the P-wall position and the non-P-wall position from the wall position detection control means 136 and recognizes the absolute position of the P-lock drive motor 68 from the information before providing the parking lock switching control. Specifically, in the parking lock switching control, the parking lock switching control means 137 first determines whether a command signal (P-motor drive command signal) actuating the P-lock drive motor 68, for example, the automatic P-lock switching request signal or the P-switching request signal, is received from the PM-HV-ECU 104. If the P-motor drive command signal is received from the PM-HV-ECU 104, the parking lock switching control means 137 sequentially reads signals from the encoder 70 to recognize the current position of the P-lock drive motor 68 and rotate the P-lock drive motor 68 in accordance with the P-motor drive command signal, and then stops the P-lock drive motor 68 when the P-target rotation position or the non-P-target rotation position corresponding to the P-motor drive command signal is reached. For example, when actuating the P-lock drive motor 68 in the parking lock switching control, if the P-motor drive command signal from the PM-HV-ECU 104 is the P-lock switching request signal (non-P-→P-position), the parking lock switching control means 137 rotates the P-lock drive motor 68 until the P-target rotation position is reached. On the other hand, if the P-motor drive command signal from the PM-HV-ECU 104 is the P-cancel switching request signal (P-→non-P-position), the parking lock switching control means 137 rotates the P-lock drive motor 68 until the non-P-target rotation position is reached. The parking lock switching control is provided in State E of FIG. 7 and is included in the normal control described in State E of FIG. 7.

If the electric motor temperature determining means 132 determines that the motor temperature $TMP_{MR}$ is lower than the low-temperature determination value TMPmin, the electric motor heat generation control means 138 provides the electric motor heat generation control of energizing the P-lock drive motor 68 without rotating the P-lock drive motor 68 after the P-ECU 106 is switched from the deactivated state to the activated state and before the provision of the P-wall position detection control and the non-P-wall position detection control is started. On the other hand, if the electric motor temperature determining means 132 does not determine that the motor temperature $TMP_{MR}$ is lower than the low-temperature determination value TMPmin, i.e., if the motor temperature $TMP_{MR}$ is equal to or higher than the low-temperature determination value TMPmin, the electric motor heat generation control means 138 does not provide the electric motor heat generation control. "After the P-ECU 106 is switched from the deactivated state to the activated state" means "after the activation determining means 130 determines that the P-ECU 106 is switched from the deactivated state to the activated state". For example, in the electric motor heat generation control, the electric motor heat generation control means 138 energizes the P-lock drive motor 68, in particular, the windings 170 of the P-lock drive motor 68, for a predetermined heat generation control time $TIME_{HEAT}$. Although the electric motor applied voltage $V_{MR}$ at the time of the electric motor heat generation control may be different from the voltages when the P-lock drive motor 68 is rotationally driven in the wall abutment control (see State D of FIG. 7) or the normal control (see State E of FIG. 7), the electric motor applied voltage $V_{MR}$ is the same as at least any one of the voltages when the P-lock drive motor 68 is rotationally driven in the wall abutment control or the normal control in this embodiment so as to simplify the electric motor heat generation control. For example, although the energized windings 170 are sequentially switched for rotationally driving the P-lock drive motor 68 in the wall abutment control or the normal control, since the P-lock drive motor 68 is not rotationally driven in the electric motor heat generation control, the energizing method in the electric motor heat generation control is the same as the energizing method in the wall abutment control or the normal control except that the energized windings 170 are sequentially switched.

The heat generation control time $TIME_{HEAT}$ is an energizing time empirically set such that the internal resistance of all the windings 170 is increased in the electric motor heat generation control to a resistance value not generating a large motor torque $T_{SR}$ requiring strength enhancement to the strength required at the time of actuation of the P-lock mechanism 66 etc., at normal temperature. Although this heat generation control time $TIME_{HEAT}$ may be a constant value, the electric motor heat generation control means 138 sets the heat generation control time $TIME_{HEAT}$ longer when the motor temperature $TMP_{MR}$ before starting the provision of the electric motor heat generation control, i.e., a motor initial temperature (electric motor initial temperature) $TMP_0$, is lower in this embodiment as depicted in FIG. 11(a). FIG. 11 is a conceptual diagram of relationship between the motor initial temperature $TMP_0$ and the heat generation control time $TIME_{HEAT}$ in the electric motor heat generation control and the effect of the provision of the electric motor heat generation control on the motor torque $T_{SR}$. As depicted in FIG. 11(a), since the heat generation control time $TIME_{HEAT}$ is set longer when the motor initial temperature $TMP_0$ is lower in the electric motor heat generation control, a heating amount to the P-lock drive motor 68 due to the energization of the windings 170 is increased. Therefore, if the electric motor heat generation control is not provided, when the motor initial temperature $TMP_0$ is lower, the internal resistance of the windings 170 becomes lower and the motor torque $T_{SR}$ at the time of driving of the P-lock drive motor 68 becomes larger as indicated by a broken line L01 of FIG. 11(b) and exceeds the upper limit value of allowable torque of the P-lock mechanism (detent mechanism) 66 in the low-temperature range; however, the provision of the electric motor heat generation control increases the internal resistance of the windings 170 in association with a rise in the motor temperature $TMP_{MR}$ and, therefore, the motor torque $T_{SR}$ after the provision of the electric motor heat generation control is reduced to a torque lower than the upper limit of the allowable torque as indicated by a solid line L02 of FIG. 11(b).

Although when providing the electric motor heat generation control, the electric motor heat generation control means 138 may provide the electric motor heat generation control along with the provision of the initial drive control by the initial drive control means 134, the electric motor heat generation control is provided after the provision of the initial drive control is completed in this embodiment. For example, if the electric motor heat generation control means 138 provides the electric motor heat generation control along with the provision of the initial drive control, the electric motor heat generation control means 138 causes the initial drive control means 134 to provide the initial drive control such that a total time of energization of the windings 170 in the initial drive control becomes equal to or longer than the heat generation control time $TIME_{HEAT}$.

Although the electric motor heat generation control means 138 may energize any of the windings 170 in the electric motor heat generation control as long as the P-lock drive motor 68 is energized without causing rotation, since the electric motor heat generation control is intended to heat the P-lock drive motor 68 and is not intended to rotationally drive the P-lock drive motor 68, the electric motor heat generation control means 138 energizes the P-lock drive motor 68 in an energization pattern locking the rotor 178 of the P-lock drive motor 68. The energization pattern locking the rotor 178 is an energization pattern preventing the rotation of the rotor 178 and is, for example, an energization pattern of energizing the winding 170 disposed on the salient pole 172 of the stator 174 closest to any of the salient poles 176 of the rotor 178 or the winding 170 disposed on the salient pole 172 of the stator 174 opposed to any of the salient poles 176 without changing the energized winding 170 during the provision of the electric motor heat generation control. Describing with reference to FIG. 4, the salient poles 172 of the stator 174 are opposed to the salient poles 176b and 176d of the rotor 178 at W- and W'-positions (W- and W'-phases) in FIG. 4 and, therefore, the energizing pattern locking the rotor 178 means energizing only the windings 170 at the W- and W'-phases.

FIG. 12 is a flowchart for explaining a first main portion of control actuation of the P-ECU 106, i.e., control actuation of providing the electric motor heat generation control after the activation of the P-ECU 106. This flowchart is executed solely or concurrently with another control actuation.

First, at step (hereinafter, "step" will be omitted) SA1 corresponding to the activation determining means 130, it is determined whether the P-ECU 106 is switched from the deactivated state to the activated state. For example, if the switch operation of the vehicle power switch 40 is performed to switch the power-supply switching state of the vehicle 10 from the ALL-OFF state or the ACC-ON state to the IG-ON state or the READY-ON state, it is determined that the P-ECU 106 is switched from the deactivated state to the activated state. If the determination of SA1 is affirmative, i.e., if the P-ECU 106 is switched from the deactivated state to the activated state, the procedure goes to SA2. On the other hand, if the determination of SA1 is negative, this flowchart is terminated.

At SA2 corresponding to the initial drive control means 134, the initial drive control of the P-lock drive motor 68 is provided. When the initial drive control is completed, the procedure goes to SA3.

At SA3 corresponding to the electric motor temperature determining means 132, it is determined whether the motor temperature $TMP_{MR}$ is lower than the low-temperature determination value TMPmin. Although the motor temperature $TMP_{MR}$ compared with the low-temperature determination value TMPmin at SA3 may be the motor temperature $TMP_{MR}$ (motor initial temperature $TMP_0$) before starting the provision of the electric motor heat generation control, the motor temperature $TMP_{MR}$ is preferably the motor temperature $TMP_{MR}$ after completing the provision of the initial drive control. If the determination of SA3 is affirmative, i.e., if the motor temperature $TMP_{MR}$ is lower than the low-temperature determination value TMPmin, the procedure goes to SA4. On the other hand, if the determination of SA3 is negative, the procedure goes to SA8.

At SA4, the heat generation control time $TIME_{HEAT}$ in the electric motor heat generation control is determined. Specifically, from the preset relationship (map) between the motor initial temperature $TMP_0$ and the heat generation control time $TIME_{HEAT}$ as depicted in FIG. 11(a), the heat generation control time $TIME_{HEAT}$ is read and determined based on the motor initial temperature $TMP_0$ that is the motor temperature $TMP_{MR}$ compared with the low-temperature determination value TMPmin at SA3, for example. After SA4, the procedure goes to SA5.

At SA 5, a timer t representative of an elapsed time is started from zero and a value thereof starts increasing. At SA6, it is determined whether the timer t is greater than the heat generation control time $TIME_{HEAT}$. If the timer t is equal to or less than the heat generation control time $TIME_{HEAT}$, the electric motor heat generation control is provided at SA7 and, if the timer t is greater than the heat generation control time $TIME_{HEAT}$, the provision of the electric motor heat generation control is terminated and the procedure goes to SA8. SA4 to SA7 correspond to the electric motor heat generation control means 138.

At SA8 corresponding to the wall position detection control means 136, the P-wall position detection control and the non-P-wall position detection control are provided. After the completion of the P-wall position detection control and the non-P-wall position detection control, the P-position 92 and the non-P-position 90 are decided in the P-ECU 106 and, therefore, the P-wall position detection control and the non-P-wall position detection control may collectively be referred to as P-position deciding control.

Figure 13:
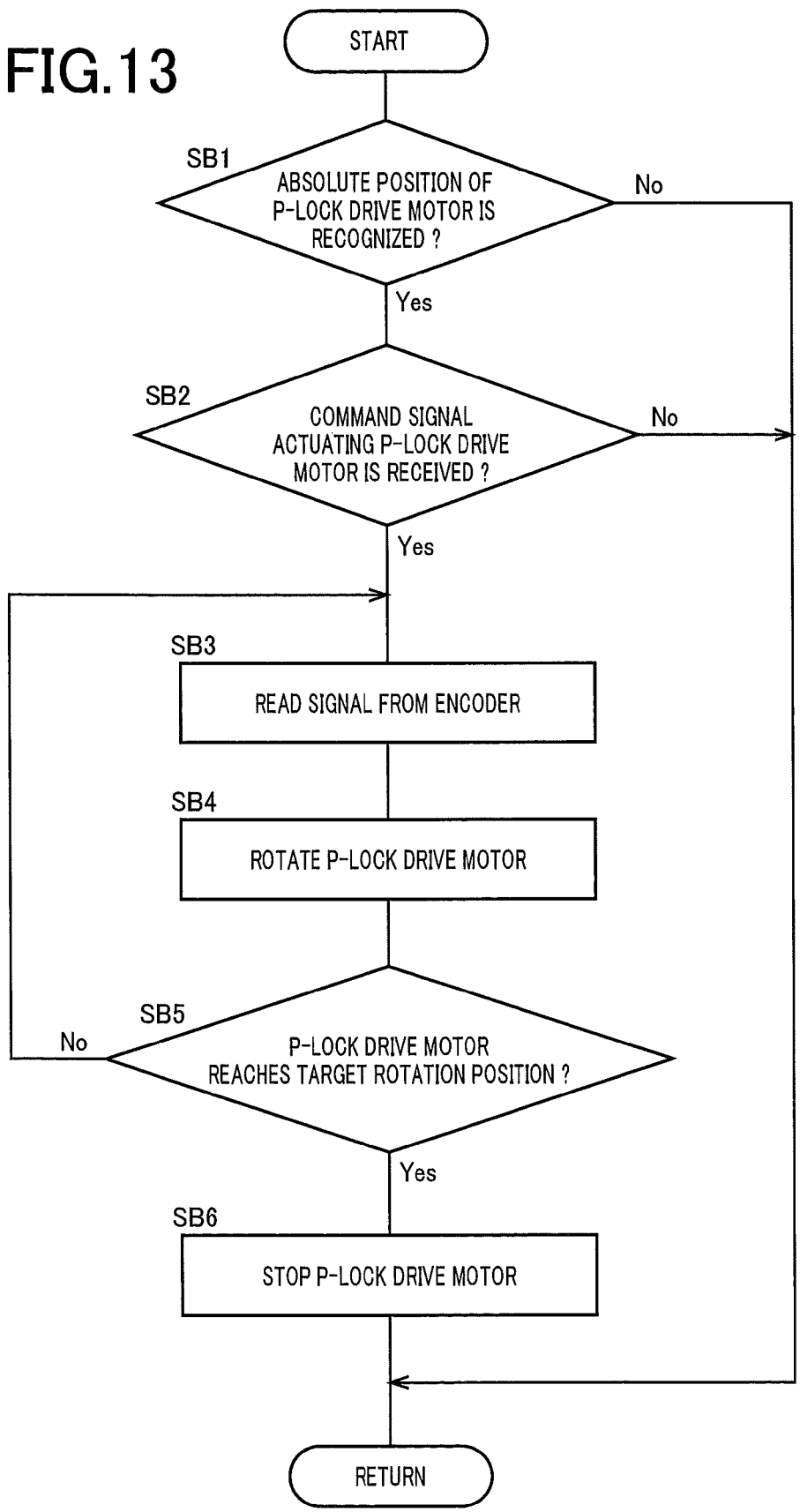
FIG. 13 is a flowchart for explaining a second main portion of control actuation of the P-ECU of FIG. 1, i.e., control actuation of providing the parking lock switching control.

FIG. 13 is a flowchart for explaining a second main portion of control actuation of the P-ECU 106, i.e., control actuation of providing the parking lock switching control. This flowchart is executed solely or concurrently with another control actuation and is executed in State E of FIG. 7.

First, at SB1, it is determined whether the absolute position of the P-lock drive motor 68 is recognized by the P-ECU 106. In other words, it is determined whether the P-wall position detection control and the non-P-wall position detection control are completed. If the determination of SB1 is affirmative, i.e., if the absolute position of the P-lock drive motor 68 is recognized, the procedure goes to SB2. On the other hand, if the determination of SB1 is negative, this flowchart is terminated.

At SB2, it is determined whether the P-motor drive command signal is received from the PM-HV-ECU 104. If the determination of SB2 is affirmative, i.e., if the P-motor drive command signal is received, the procedure goes to SB3. On the other hand, if the determination of SB2 is negative, this flowchart is terminated.

At SB3, a signal from the encoder 70 is read and, as a result, the current position (absolute position) of the P-lock drive motor 68 is recognized. After SB3, the procedure goes to SB4.

At SB4, the P-lock drive motor 68 is rotationally driven toward the P-target rotation position or the non-P-target rotation position corresponding to the P-motor drive command signal. After SB4, the procedure goes to SB5.

At SB5, it is determined whether the P-lock drive motor 68 reaches the P-target rotation position or the non-P-target rotation position corresponding to the P-motor drive command signal, i.e., the target rotation position of the P-lock drive motor 68. If the determination of SB5 is affirmative, i.e., if the P-lock drive motor 68 reaches the target rotation position, the procedure goes to SB6. On the other hand, if the determination of SB5 is negative, the procedure returns to SB3, and SB3 and SB4 are repeated until the determination of SB5 is affirmed.

At SB6, the P-lock drive motor 68 is stopped. SB1 to SB6 correspond to the parking lock switching control means 137. Therefore, SB2 to SB6 are performed in the parking lock switching control.

As described above, according to the embodiment, if the electric motor temperature determining means 132 determines that the motor temperature $TMP_{MR}$ is lower than the low-temperature determination value TMPmin, the electric motor heat generation control means 138 provides the electric motor heat generation control of energizing the P-lock drive motor 68 without rotating the P-lock drive motor 68 after the P-ECU 106 is switched from the deactivated state to the activated state and before the provision of the wall abutment control (the P-wall position detection control and the non-P-wall position detection control) is started, i.e., before the provision of the parking lock switching control is started. As a result, if the motor temperature $TMP_{MR}$ is lower than the low-temperature determination value TMPmin, since the P-lock drive motor 68 is energized to generate heat by the provision of the electric motor heat generation control, the internal resistance of the P-lock drive motor 68, i.e., the internal resistance of the windings 170, is increased to some extent before starting the provision of the parking lock switching control and the motor torque $T_{SR}$ based on the supply current to the P-lock drive motor 68 is suppressed in accordance with the internal resistance. Therefore, the motor torque $T_{SR}$ during the provision of the parking lock switching control can be suppressed to an allowable level and, specifically, as depicted in FIG. 11(b), the motor torque $T_{SR}$ can be suppressed to be equal to or less than the upper limit of allowable torque of the P-lock mechanism 66, thereby suppressing the deterioration in durability of the P-lock mechanism 66 that is a mechanical member transmitting the motor torque $T_{SR}$. Since it is not necessary to dispose a current limit circuit limiting the supply current to the P-lock drive motor 68 to a predetermined limit value or less and it is not necessary to enhance the strength of the P-lock mechanism 66 in accordance with the motor torque $T_{SR}$ in the case of the motor temperature $TMP_{MR}$ lower than the low-temperature determination value TMPmin, cost increase can be suppressed in the vehicle shift control device 50.

According to the embodiment, the electric motor heat generation control means 138 provides the electric motor heat generation control before starting the provision of the wall abutment control (the P-wall position detection control and the non-P-wall position detection control). In the P-wall position detection control and the non-P-wall position detection control, the motor torque $T_{SR}$ must be received at the mechanical displacement ends (the non-P-wall 94 and the P-wall 96) by the constituent members of the parking lock device 16, for example, the shaft 72, the detent plate 74, the detent spring 82, and the roller 84 making up the P-lock mechanism 66. Therefore, since it is not necessary to enhance the strength of the constituent members of the parking lock device 16 in accordance with the motor torque $T_{SR}$ in the case of the motor temperature $TMP_{MR}$ lower than the low-temperature determination value TMPmin, i.e., the motor torque $T_{SR}$ at very low temperature, the cost of the parking lock device 16 can be suppressed. Since the provision of the P-wall position detection control and the non-P-wall position detection control enables the recognition of the absolute position of the P-lock drive motor 68 by using the encoder 70 that is a relative position sensor, the cost of the parking lock device 16 can be suppressed as compared to the case of the encoder 70 that is an absolute position sensor.

According to the embodiment, the P-lock drive motor 68 is a motor that includes the stator 174 having a plurality of the salient poles 172 with the windings 170 wound therearound and the rotor 178 disposed rotatably relative to the stator 174 and having a plurality of the salient poles 176 and that rotates the rotor 178 by sequentially supplying a current to the windings 170 based on the rotation position information (rotation angle) of the rotor 178. Therefore, since the P-lock drive motor 68 has a simple structure, the vehicle shift control device 50 can be made inexpensive and mechanically reliable.

According to the embodiment, if the P-ECU 106 is switched from the deactivated state to the activated state, the initial drive control means 134 provides the initial drive control of energizing the P-lock drive motor 68 for allowing the P-ECU 106 to recognize the relative positional relationship between the rotor 178 and the stator 174 of the P-lock drive motor 68. The electric motor heat generation control means 138 provides the electric motor heat generation control after completing the provision of the initial drive control. Therefore, since the provision of the initial drive control reveals which of the windings (coils) 170 disposed on the stator 174 of the P-lock drive motor 68 is energized without rotating the P-lock drive motor 68, the energization pattern enabling energization of the P-lock drive motor 68 without rotating the P-lock drive motor 68 can easily be determined in the electric motor heat generation control.

According to the embodiment, in the electric motor heat generation control, energizing the P-lock drive motor 68 without rotating the P-lock drive motor 68 means that the P-lock drive motor 68 is energized in the energization pattern locking the rotor 178 of the P-lock drive motor 68. Therefore, since the rotor 178 of the P-lock drive motor 68 is actively prevented from rotating, this can reduce the possibility that the P-lock drive motor 68 accidentally rotates during the provision of the electric motor heat generation control. For example, when the motor temperature $TMP_{MR}$ is at very low temperature, the possibility of generating the motor torque $T_{SR}$ exceeding the upper limit value (see FIG. 11(*b*)) of the allowable torque of the P-lock mechanism 66 can be reduced.

According to the embodiment, the electric motor heat generation control means 138 energizes the P-lock drive motor 68 for the heat generation control time $TIME_{HEAT}$ in the electric motor heat generation control and sets the heat generation control time $TIME_{HEAT}$ longer when the motor temperature $TMP_{MR}$ (motor initial temperature TWIN before starting the provision of the electric motor heat generation control is lower. Therefore, the internal resistance of the P-lock drive motor 68, i.e., the internal resistance of the windings 170, can be made less variable after the provision of the electric motor heat generation control if the motor initial temperature $TMP_0$ is different. For example, if the P-lock drive motor 68 is at very low temperature, sufficient heat generation is achieved, while if the motor initial temperature $TMP_0$ is closer to the low-temperature determination value TMPmin, the electric motor heat generation control can be completed earlier.

According to the embodiment, if the motor temperature $TMP_{MR}$ is equal to or greater than the low-temperature determination value TMPmin, the electric motor heat generation control means 138 does not provide the electric motor heat generation control and, therefore, if the provision of the electric motor heat generation control is not necessary, the provision of the wall abutment control (see State D of FIG. 7) and the provision of the parking lock switching control can be started early after the P-ECU 106 is switched from the deactivated state to the activated state and wasteful power consumption can be avoided.

According to the embodiment, a temperature detected by the vehicle drive device 29, for example, the cooling water temperature $TMP_W$ or the operating oil temperature $TMP_{AT}$ may be considered as the motor temperature $TMP_{MR}$ and, in such a case, the electric motor temperature sensor 45 is not necessary and the cost can be suppressed.

According to the embodiment, since the P-lock drive motor 68 is disposed with the electric motor temperature sensor 45 and the electric motor temperature sensor 45 detects the motor temperature $TMP_{MR}$, the motor temperature $TMP_{MR}$ is accurately detected and, therefore, the necessity of the electric motor heat generation control can accurately be determined.

Although the embodiment of the present invention has been described in detail with reference to the drawings, the present invention is applicable in other forms.

For example, in the positional relationship between the stator 174 and the rotor 178 depicted in FIG. 4 of the embodiment, the salient poles 172 of the stator 174 and the salient poles 176*b* and 176*d* of the rotor 178 are opposed to each other at the W- and W'-phases and, therefore, only the windings 170 of the W- and W'-phases are energized in the electric motor heat generation control; however, one or three or more of the windings 170 may be energized rather than energizing a pair of the windings 170 disposed on the opposed salient poles 172. The energized windings 170 may not be paired.

Although the motor temperature $TMP_{MR}$ (motor initial temperature $TMP_0$) indicated by the horizontal axis of FIGS. 11(*a*) and 11(*b*) is detected by the electric motor temperature sensor 45 in the embodiment, the cooling water temperature $TMP_W$ or the operating oil temperature $TMP_{AT}$ may be considered as the motor temperature $TMP_{MR}$ to set the heat generation control time $TIME_{HEAT}$.

Although the six salient poles 172 of the stator 174 and the four salient poles 176 of the rotor 178 exist in FIG. 4 of the embodiment, the number of the poles of the P-lock drive motor 68 is not particularly limited and the numbers of the salient poles 172 and the salient poles 176 may be greater than six and four, respectively.

Although the initial drive control is provided when the P-ECU 106 is switched from the deactivated state to the activated state in the embodiment, it is conceivable that the electric motor heat generation control is provided without the provision of the initial drive control.

Although the switch operation of the vehicle power switch 40 is exemplified as the case of switching the P-ECU 106 from the deactivated state to the activated state in the embodiment, the P-ECU 106 may be switched from the deactivated state to the activated state by other than the switch operation of the vehicle power switch 40. For example, if the vehicle 10 has a function of accepting a remote engine start operation starting the engine 12 with a remote controller operation by a driver from the outside of the vehicle, the P-ECU 106 is switched from the deactivated state to the activated state when the remote engine start operation is performed. If the vehicle 10 is a so-called plug-in hybrid vehicle having the electric storage device 52 chargeable from an external power source, the P-ECU 106 is switched from the deactivated state to the activated state when it is detected that a charging connector from the external power source is connected to the vehicle 10. Even if the P-ECU 106 is switched from the deactivated state to the activated state by the remote engine start operation or the connection of the charging connector as described above, the activation determining means 130 determines that the P-ECU 106 is switched from the deactivated state to the activated state.

Although the encoder 70 is a relative position sensor in the embodiment, the encoder 70 may be an absolute position sensor detecting the absolute position of the P-lock drive motor 68. For example, if the encoder 70 is an absolute position sensor as described above, the P-wall position detection control and the non-P-wall position detection control are not needed and SB1 is not needed in the flowchart of FIG. 13.

The described embodiment is merely an exemplary embodiment and the present invention may be implemented in variously modified and improved forms based on the knowledge of those skilled in the art.

DESCRIPTION OF REFERENCE NUMERALS

- 14: drive wheels (wheels)
- 16: parking lock device
- 29: vehicle drive device (drive device)
- 45: electric motor temperature sensor
- 50: vehicle shift control device
- 68: P-lock drive motor (electric motor)
- 106: P-ECU (electronic control device)
- 170: windings
- 172: salient poles of the stator
- 174: stator
- 176a, 176b, 176c, 176d: salient poles of the rotor
- 178: rotor

The invention claimed is:

1. A vehicle shift control device comprising: a parking lock device selectively switched by driving of an electric motor between a lock position restraining rotation of wheels and a non-lock position not restraining the rotation of the wheels; and an electronic control device controlling the electric motor, the vehicle shift control device providing a parking lock switching control of selectively switching the parking lock device between the lock position and the non-lock position in an activated state of the electronic control device, wherein
   when the electronic control device is switched from the deactivated state to the activated state, the vehicle shift control device provides a wall abutment control of driving the parking lock device with the electric motor to a mechanical displacement end before starting the provision of the parking lock switching control, and
   when a temperature of the electric motor is lower than a predefined low-temperature determination value, the vehicle shift control device provides an electric motor heat generation control of energizing the electric motor without rotating the electric motor after the electronic control device is switched from a deactivated state to an activated state and before starting the provision of the wall abutment control.

2. The vehicle shift control device of claim 1, wherein the electric motor is a motor that includes a stator having a plurality of salient poles with windings wound therearound and a rotor disposed rotatably relative to the stator and having a plurality of salient poles and that rotates the rotor by sequentially supplying a current to the windings based on rotation position information of the rotor.

3. The vehicle shift control device of claim 2, wherein when the electronic control device is switched from the deactivated state to the activated state, the vehicle shift control device provides initial drive control of energizing the electric motor for recognizing a relative positional relationship between the rotor and the stator of the electric motor and provides the electric motor heat generation control after the provision of the initial drive control.

4. The vehicle shift control device of claim 2, wherein
in the electric motor heat generation control, energizing the electric motor without rotating the electric motor means that the electric motor is energized in an energization pattern locking the rotor of the electric motor.

5. The vehicle shift control device of claim 3, wherein
in the electric motor heat generation control, energizing the electric motor without rotating the electric motor means that the electric motor is energized in an energization pattern locking the rotor of the electric motor.

6. The vehicle shift control device of claim 1, wherein
in the electric motor heat generation control, the electric motor is energized for a predefined heat generation control time, and wherein
when a temperature of the electric motor before starting the provision of the electric motor heat generation control is lower, the heat generation control time is made longer.

7. The vehicle shift control device of claim 2, wherein
in the electric motor heat generation control, the electric motor is energized for a predefined heat generation control time, and wherein
when a temperature of the electric motor before starting the provision of the electric motor heat generation control is lower, the heat generation control time is made longer.

8. The vehicle shift control device of claim 3, wherein
in the electric motor heat generation control, the electric motor is energized for a predefined heat generation control time, and wherein
when a temperature of the electric motor before starting the provision of the electric motor heat generation control is lower, the heat generation control time is made longer.

9. The vehicle shift control device of claim 4, wherein
in the electric motor heat generation control, the electric motor is energized for a predefined heat generation control time, and wherein
when a temperature of the electric motor before starting the provision of the electric motor heat generation control is lower, the heat generation control time is made longer.

10. The vehicle shift control device of claim 5, wherein
in the electric motor heat generation control, the electric motor is energized for a predefined heat generation control time, and wherein
when a temperature of the electric motor before starting the provision of the electric motor heat generation control is lower, the heat generation control time is made longer.

11. The vehicle shift control device of claim 1, wherein
when the temperature of the electric motor is equal to or higher than the low-temperature determination value, the electric motor heat generation control is not provided.

12. The vehicle shift control device of claim 2, wherein
when the temperature of the electric motor is equal to or higher than the low-temperature determination value, the electric motor heat generation control is not provided.

13. The vehicle shift control device of claim 3, wherein
when the temperature of the electric motor is equal to or higher than the low-temperature determination value, the electric motor heat generation control is not provided.

14. The vehicle shift control device of claim 1, wherein
a temperature detected in a drive device driving the wheels is considered as the temperature of the electric motor.

15. The vehicle shift control device of claim 2, wherein
a temperature detected in a drive device driving the wheels is considered as the temperature of the electric motor.

16. The vehicle shift control device of claim 3, wherein
a temperature detected in a drive device driving the wheels is considered as the temperature of the electric motor.

17. The vehicle shift control device of claim 1, wherein
the electric motor is disposed with an electric motor temperature sensor, and wherein the temperature of the electric motor is detected by the electric motor temperature sensor.

18. The vehicle shift control device of claim 2, wherein
the electric motor is disposed with an electric motor temperature sensor, and wherein the temperature of the electric motor is detected by the electric motor temperature sensor.

19. The vehicle shift control device of claim 3, wherein
the electric motor is disposed with an electric motor temperature sensor, and wherein the temperature of the electric motor is detected by the electric motor temperature sensor.

20. The vehicle shift control device of claim 1, wherein the predefined low temperature determination value is a temperature value that is determined such that, when the wall abutment control is executed with the temperature of the electric motor being not lower than the predefined low-temperature determination value, the wall abutment control is executed with a torque of the electric motor not exceeding an upper limit value.

\* \* \* \* \*